(12) United States Patent
Wilkins et al.

(10) Patent No.: US 11,376,538 B2
(45) Date of Patent: Jul. 5, 2022

(54) AIR FILTER APPARATUSES AND RELATED METHODS

(71) Applicants: Jennifer L. Wilkins, Phoenix, AZ (US); Celia P. Mendoza, Scottsdale, AZ (US)

(72) Inventors: Jennifer L. Wilkins, Phoenix, AZ (US); Celia P. Mendoza, Scottsdale, AZ (US)

( * ) Notice: Subject to any disclaimer, the term of this patent is extended or adjusted under 35 U.S.C. 154(b) by 0 days.

(21) Appl. No.: 17/444,660

(22) Filed: Aug. 6, 2021

(65) Prior Publication Data

US 2022/0040617 A1 Feb. 10, 2022

Related U.S. Application Data

(60) Provisional application No. 62/706,254, filed on Aug. 6, 2020.

(51) Int. Cl.
*B01D 46/00* (2022.01)
*B01D 46/52* (2006.01)
*B01D 46/10* (2006.01)

(52) U.S. Cl.
CPC ..... *B01D 46/0005* (2013.01); *B01D 46/0004* (2013.01); *B01D 46/10* (2013.01); *B01D 46/521* (2013.01)

(58) Field of Classification Search
None
See application file for complete search history.

(56) References Cited

U.S. PATENT DOCUMENTS

| | | | |
|---|---|---|---|
| 3,023,839 A | 3/1962 | Best | |
| 3,154,393 A | 10/1964 | Klein et al. | |
| 4,323,379 A | 4/1982 | Shearin | |
| 4,450,964 A * | 5/1984 | Wood | G21F 3/00 206/527 |
| 4,521,234 A * | 6/1985 | Peebles, Jr. | B01D 46/0091 55/481 |
| 4,636,233 A | 1/1987 | Lizmore | |

(Continued)

OTHER PUBLICATIONS

"Five Tips for Properly Disposing of an Old Air Filter," published in the U.S. at least as early as Feb. 20, 2020.

(Continued)

*Primary Examiner* — Christopher P Jones
*Assistant Examiner* — Phillip Y Shao
(74) *Attorney, Agent, or Firm* — Law Office of Paul B. Johnson; Paul B. Johnson

(57) ABSTRACT

An air filter apparatus includes an air filter having a filtering medium at least partially housed within a housing. A cover is coupled with the air filter. A collapsed disposal bag is situated at least partially between the cover and air filter and may be secured to (or coupled with) the air filter. The cover is configured to be manually opened to expose the disposal bag and allow expansion of the bag. Before the cover is opened it is configured to retain the bag in the collapsed configuration. The bag in the expanded configuration is sized to receive and enclose the air filter. In implementations the air filter is a residential or commercial HVAC air filter. Methods of manufacture include securing the bag to the air filter, configuring the bag in the collapsed configuration, and securing the cover over the bag to keep it collapsed until the cover is opened.

20 Claims, 26 Drawing Sheets

(56) References Cited

U.S. PATENT DOCUMENTS

| | | | |
|---|---|---|---|
| 5,837,040 A * | 11/1998 | Caughron | B01D 46/0098 96/224 |
| 5,840,094 A | 11/1998 | Osendorf et al. | |
| 6,319,300 B1 | 11/2001 | Chen | |
| 6,464,745 B2 | 10/2002 | Rivera et al. | |
| 6,595,247 B1 * | 7/2003 | Landy | F42B 33/06 141/114 |
| 6,623,540 B2 * | 9/2003 | Clayton | B01D 46/10 55/480 |
| 6,821,200 B2 * | 11/2004 | Chilcoat | B01D 46/0043 454/56 |
| 7,156,891 B2 | 1/2007 | Winters et al. | |
| 7,618,483 B2 * | 11/2009 | Huza | B01D 46/0084 55/481 |
| 7,993,437 B2 * | 8/2011 | Huza | B01D 46/008 96/414 |
| 8,002,867 B2 * | 8/2011 | Morgan | B01D 46/008 55/478 |
| 2007/0044438 A1 * | 3/2007 | Morse | B23P 6/00 55/342 |
| 2007/0289274 A1 | 12/2007 | Justice et al. | |
| 2009/0183477 A1 | 7/2009 | Workman | |
| 2017/0144093 A1 * | 5/2017 | Neri | B01D 46/4227 |

OTHER PUBLICATIONS

Wikihow article titled "How to Change a Home Air Filter (with Pictures)," published Jul. 7, 2020, available online at http://web.archive.org/web/20200804154722/https://www.wikihow.com/Change-a-Home-Air-Filter#/Image:Change-a-Home-Air-Filter-Step-13.jpg, last visited Aug. 6, 2021.

* cited by examiner

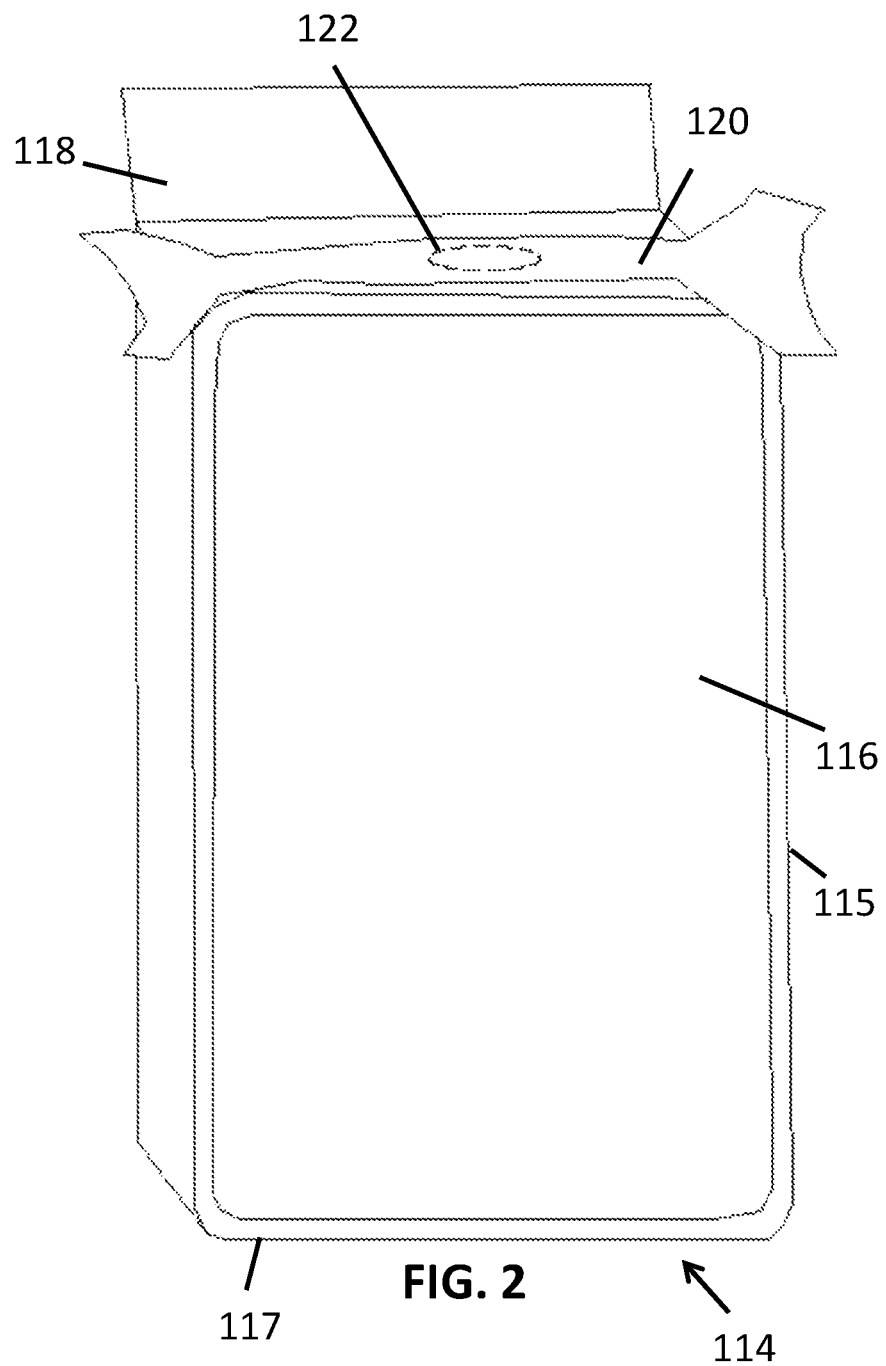

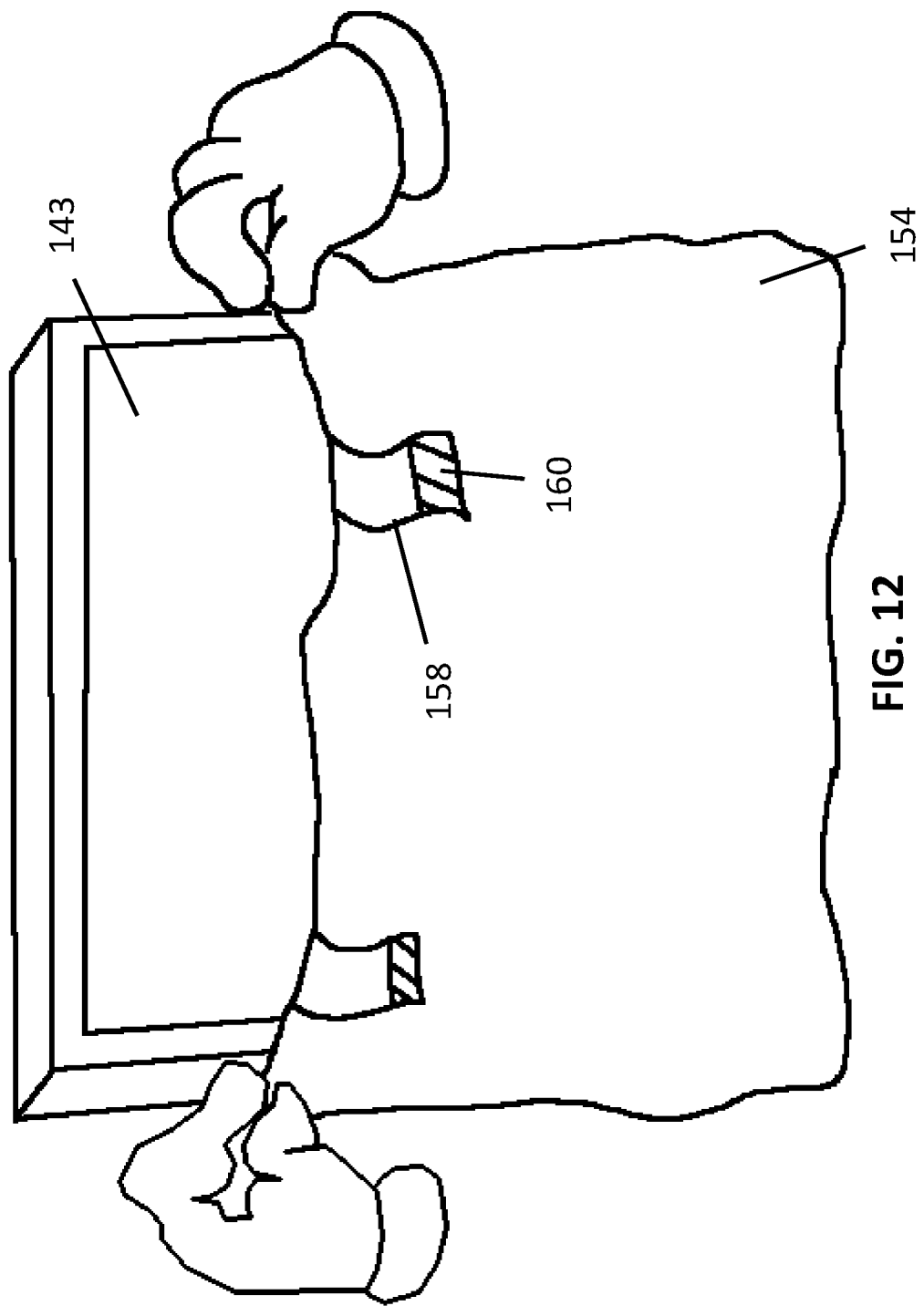

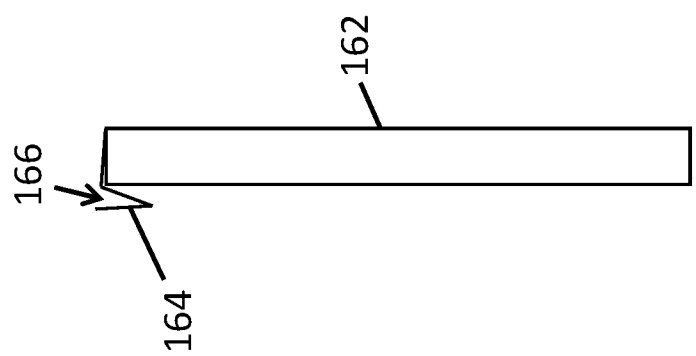

AIR FILTER APPARATUSES AND RELATED METHODS

CROSS REFERENCE TO RELATED APPLICATIONS

This document claims the benefit of the filing date of U.S. Provisional Patent Application No. 62/706,254, entitled "Air Filter Apparatuses and Related Methods," naming as first inventor Jennifer L. Wilkins, which was filed on Aug. 6, 2020, the disclosure of which is hereby incorporated entirely herein by reference.

BACKGROUND

1. Technical Field

Aspects of this document relate generally to air filters, such as filters used in residential and commercial heating systems, cooling systems, ventilation systems, and heating, ventilation and air conditioning (HVAC) systems.

2. Background Art

Conventional air filters—such as filters used in residential and commercial heating, cooling, ventilation, and HVAC systems—include a filtering medium at least partially housed within a housing. Conventional garbage/disposal bags are formed of polymers and include a cavity and an opening providing access to the cavity.

SUMMARY

Implementations of air filter apparatuses may include: an air filter including a filtering medium at least partially housed within a housing; a cover coupled with the air filter; and a disposal bag in a fully collapsed configuration situated at least partially between the cover and the air filter; wherein the cover is configured to be manually opened to expose the disposal bag and to allow expansion of the disposal bag to an expanded configuration; and wherein the disposal bag in the expanded configuration is sized to fully receive the air filter and to be secured closed with the air filter therein.

Implementations of air filter apparatuses may include one or more or all of the following:

The air filter may be a residential HVAC air filter or a commercial HVAC air filter.

The disposal bag in the fully collapsed configuration may be folded.

The disposal bag in the fully collapsed configuration may be folded in an accordion fold.

The cover may include a flap.

The flap may have a fold.

The flap may have two folds.

The flap may have three folds.

The cover may include a bag holder not integrally formed with the housing but attached to the housing, the bag holder at least partially surrounding the disposal bag when in a closed configuration.

The bag holder may have one or more flaps secured closed and manually openable, the one or more flaps configured to retain the disposal bag in the fully collapsed configuration when secured closed.

The cover may include a pull strip configured to expose the disposal bag.

The pull strip may be coupled, using an adhesive, to the air filter and/or the disposal bag.

The pull strip may be configured to expose the disposal bag by forming one of an opening and a tear.

The disposal bag may include a closure member proximate an opening of the disposal bag and configured to close the opening of the disposal bag.

The closure member may include one or more tape strips having removable portions configured to expose an adhesive.

The disposal bag may be attached to the air filter.

The disposal bag may be attached to the air filter using an adhesive.

One or more magnets may be coupled with the air filter.

Implementations of air filter apparatuses may include: an HVAC air filter including a filtering medium at least partially housed within a housing; a disposal bag coupled with the housing using an adhesive, the disposal bag in a fully collapsed configuration; and a cover secured closed over the disposal bag and configured to retain the disposal bag in the fully collapsed configuration, the cover configured to be manually opened to expose the disposal bag and to allow inversion of the disposal bag inside-out and expansion of the disposal bag to an expanded configuration; wherein the disposal bag when inverted inside-out and expanded to the expanded configuration is sized and configured to fully receive and fully enclose the HVAC air filter while remaining coupled with the housing using the adhesive.

Implementations of methods of manufacture of air filter apparatuses may include: securing a cover to an air filter, the air filter comprising a filtering medium at least partially housed within a housing; and coupling a disposal bag between the air filter and at least a portion of the cover; wherein the cover in a closed configuration is configured to retain the disposal bag in a fully collapsed configuration; wherein the cover is configured to be manually opened to expose the disposal bag and to allow expansion of the disposal bag to an expanded configuration; and wherein the disposal bag in the expanded configuration is sized to fully receive and fully enclose the air filter. It is pointed out that in some implementations (for example implementations in which the cover already includes the disposal bag coupled therewith before the cover is secured to the air filter) the very act of securing the cover to the air filter may itself couple the disposal bag between the air filter and a portion of the cover. Methods of manufacture may include configuring the bag in the collapsed configuration and/or securing the cover to the air filter and/or to a closed configuration in such a way as to retain the disposal bag in the collapsed configuration until the cover is manually opened.

General details of the above-described implementations, and other implementations, are given below in the DESCRIPTION, the DRAWINGS, the CLAIMS and the ABSTRACT.

BRIEF DESCRIPTION OF THE DRAWINGS

Implementations will be discussed hereafter using reference to the included drawings, briefly described below, wherein like designations refer to like elements. The drawings are not necessarily drawn to scale.

FIG. 2 is a front perspective view of another implementation of an air filter apparatus;

FIG. 12 is a front perspective view of the air filter apparatus of FIG. 9 during a bagging step;

FIG. 12A is a side view of components of another implementation of an air filter apparatus;

DESCRIPTION

Figure 1A:
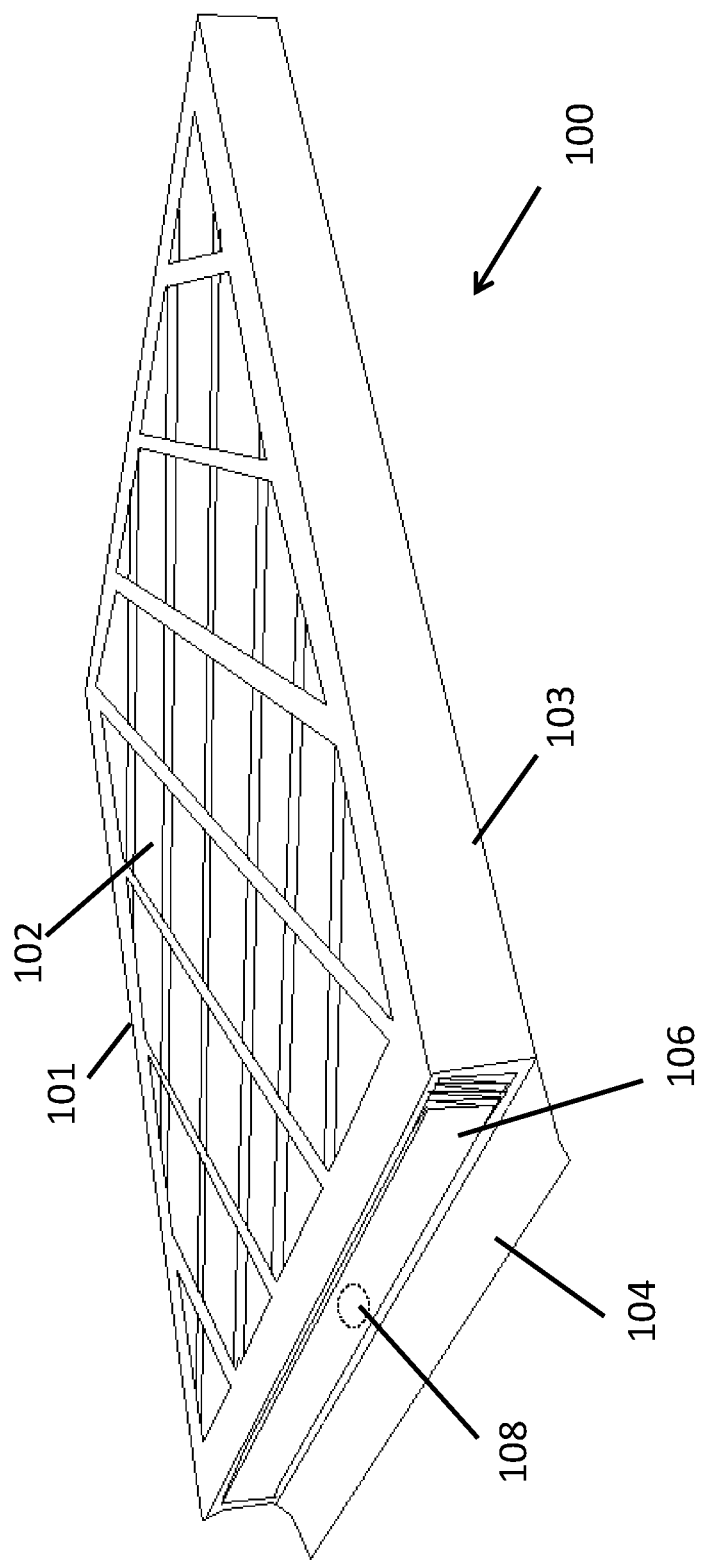
FIG. 1A is a side perspective view of an implementation of an air filter apparatus.

Implementations/embodiments disclosed herein (including those not expressly discussed in detail) are not limited to the particular components or procedures described herein. Additional or alternative components, assembly procedures, and/or methods of use consistent with the intended air filter apparatuses and related methods may be utilized in any implementation. This may include any materials, components, sub-components, methods, sub-methods, steps, and so forth.

Implementations of air filter apparatuses relate to air filters having bags coupled therewith for air filter disposal.

It is pointed out here that the drawings, and elements in the drawings, are not necessarily drawn to scale, and in some cases the drawings or portions thereof are drawn in simplified format, leaving some things out, for clarity and ease of viewing other elements.

Referring now to FIG. 1A, an implementation of an air filter apparatus (apparatus) 100 is shown. The air filter apparatus includes an air filter 101 comprising a filtering medium 102 at least partially housed within a housing 103. Air filters are used in residential and commercial applications to filter air that is passing through a heating unit (by non-limiting example, a furnace), cooling unit, ventilation unit, and/or heating, ventilation and air conditioning (HVAC) unit. In some cases/settings air that passes through one of these units enters from outside of a building, while in other cases/settings air is being recirculated within the building. In either case, air filters are used to filter dust, pollutants, allergens, debris, particles, and other items and particulates out of the air as it passes through the system.

Because air filters are filtering dust, debris, and other items and particulates out of the air, over time they gather more and more of such items therein. As time passes they may lose the ability to filter the air well (or as well), or they may restrict air flow. Accordingly, it is common in the industry to replace air filters either once they are filled to a certain extent with such items or on a schedule.

When replacing an old air filter, the old air filter generally needs to be thrown away. It is common for the user to need to remove the old air filter and carry it to a trash receptacle in order to do this. Unfortunately, carrying an air filter from the HVAC or similar unit to a trash receptacle can often result in dust particles, debris, and other items and particulates shaking loose from the air filter and coming out onto the floor or into the air of the building (even just from the motion of walking with the air filter). If the air filter is accidentally bumped against something, this exacerbates the issue. Additionally, often the old air filter is set down and leaned against a wall or the like while the new air filter is being inserted, and this also can result in dust and debris being separated from the air filter and put back into the air or on the ground. Having dust and debris from the old air filter enter the air again is of course inconvenient and ineffective. There is often not a trash receptacle in the room where the air filter was removed, so a user often has to carry the air filter across the house, up or down stairs, and so forth, which tends to jostle the air filter and shake loose the debris and dust that is on or in the air filter.

Figure 1B:
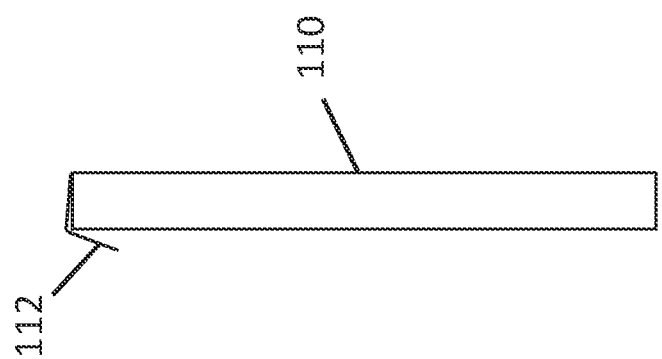
FIG. 1B is a side view of a conventional air filter.
Figure 1C:
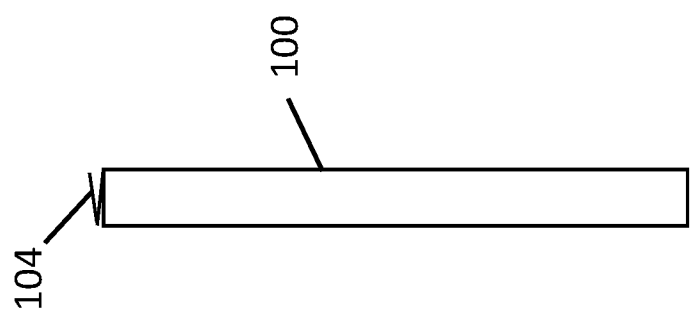
FIG. 1C is a side view of components of the air filter apparatus of FIG. 1A.

The air filter apparatuses disclosed herein seek to address the issues discussed above. Referring back to FIG. 1A, an air filter apparatus (apparatus) 100 is illustrated. The air filter 101 of the apparatus is a pleated air filter (because the filtering medium is pleated), and apparatus 100 includes a flap (cover) 104 at the top of the housing. Such flaps are common in the industry and normally cover the top of the air filter or housing and fold downward against the front or back of the housing (as with flap 112 of conventional air filter 110 illustrated in FIG. 1B, for example, though FIG. 1B does not show the flap fully secured to the top and back—it rather shows the flap in a nearly-closed configuration so that it is more easily viewable). However, with apparatus 100 a first portion of flap 104 is first folded to cover the top of the air filter or housing and a second portion of the flap is then folded backwards upon itself to enclose the bag (creating an accordion-type fold) as seen in FIG. 1C (though FIG. 1C does not show the flap fully secured to the top and then back again against itself—it rather shows the flap in a nearly-closed configuration so that it is more easily viewable—the bag (discussed below) and adhesive are not shown for ease in viewing other elements).

The air filter apparatus 100 includes a bag 106 (for example, a polymer or paper bag) which is folded and attached to the top of the housing using an adhesive 108 such as a glue, wax, etc. In FIG. 1A the bag is attached to the top of the first portion of the flap and the second portion of the flap is not folded backwards over the bag yet (or it has been opened to reveal the bag).

In implementations, allowing the cover of the bag to be formed using a folded flap allows for a simple construction where an existing flap can simply be made longer and folded, or folded in a different orientation than previously, to secure the bag.

In the implementation shown in FIG. 1A the bag is folded in an accordion fold, though other folds are possible (an accordion fold may, however, have an advantage of maintaining a flat and non-angled shape of the collapsed bag), and the adhesive 108 adhering the bag to the top of the housing is a single spot of an adhesive glue. In other implementations the adhesive could be a strip of glue along the length of the top of the housing, or a tape (such as a double-sided tape) extending along all or a portion of the length of the top of the housing, and so forth. The adhesive 108 pointed to in FIG. 1A is shown in dotted lines to represent that it is between the bag and the housing—its outline is shown to give one representative example of its location and configuration.

As indicated, the flap may fold backwards over the bag to secure the bag in the folded configuration. This may be done for example by securing the first portion of the flap flat (as in FIG. 1A) by securing it to another portion of the housing or the filtering medium (such as using an adhesive or staple(s) or another attachment mechanism) and then securing the second portion of the flap against the first portion of the flap (as nearly shown in FIG. 1C) using an adhesive or staple(s) or other attachment mechanism. In any case the cover/flap may be manually removable/openable to expose the bag, by manually breaking the attachment (be it adhesive or staple(s) or some other element) between the first portion and second portion of the flap.

The user may expand the bag 106 by pulling it away from the housing. The accordion fold or other type of fold of the bag allows the bag to be expanded and opened, and once the bag is opened and expanded the air filter may be turned upside down, the bag may be inverted, and the air filter may simply be dropped into the bag (or in the case where the air filter is bottom loaded upwards into an HVAC unit or the like so that the top of the housing faces downward when installed, the bag may simply be expanded and then inverted while or before the air filter is dropped into it). The bag may be closed or tied and thereafter carried to a trash receptacle. This provides a convenient way to dispose of the old air filter without risk of spreading dust, debris, and other items through the house as could occur when the air filter is not in a bag.

The bag could be formed of any type of useful material, such as a paper, a polymer, a thin cardboard/cardstock material, or another bag-like material. In implementations it could be formed out of polymers that commonly form trash bags or grocery bags. Conventional air filters often come enclosed in a thin polymer wrap or seal already, to keep the air filters clean before use, and in implementations the bags disclosed herein could be formed from the same materials which are used to form the wrap or seal. The adhesive could be any type of adhesive that is useful for adhering the bag to the air filter.

Not all air filter housings include a flap like those shown with air filters 101 and 110, but for those that do not include the flap the bag may still be adhered to the top or to some other side of the housing, even if not covered by a portion of the air filter cardboard or other material itself (e.g., even if not covered by a flap of the air filter itself), to be used in the same manner as described above. Although the bag is shown attached to the top of the housing in FIG. 1A, in other implementations it could instead be attached to the bottom of the housing (for example if the air filter is top loaded downward into an HVAC unit or the like so that the bottom of the housing faces downward when installed, the bag may be placed at the bottom of the housing so that once the air filter is pulled back up out of the HVAC unit or the like the air filter does not need to be inverted, only the bag, to drop the air filter in the bag). The bag could instead be located on one of the sides of the housing (for example if the air filter is side-loaded into an HVAC unit or the like the bag may be placed on the side of the housing so that when the air filter is removed the bag may be inverted and the air filter slid sideways into it while the air filter is being withdrawn from the HVAC unit or the like, and without inverting the air filter). In implementations the air filter has a relatively tight fit in its slot or location (of an HVAC unit or the like) when it is in use, so that placing the bag at a top, bottom or side of the housing that does not interfere with the loading/unloading may be useful. The location of the bag on the housing can be such that, when a side/top/bottom of the air filter is exposed (such as by opening a door or slot or grill or the like of an HVAC unit or the like) to remove the air filter, the bag is on the side/top/bottom/face of the housing that is exposed, so that the bag can easily be opened and used to dispose of the air filter (i.e., whether the air filter is inserted upwards, downward, sideways, etc.).

Some air filters would be loaded upwards into an HVAC grill/slot/enclosure or the like with the top of the housing facing down so that, when the air filter is to be removed, if the bag is at the top of the housing the bag can simply be exposed, opened and inverted, and then the air filter can drop out of the grill or slot directly into the bag. Additionally, having the bag coupled with the housing is useful in such a situation because traditionally an air filter in such a configuration could fall out on its own once the grill/slot/enclosure is opened, thus spilling dust and debris (or dropping dust and debris into the user's eyes), whereas with the inventions disclosed herein the user could hold the air filter in (to keep it from falling or shifting) with one hand while, with the other hand, opening the bag and preparing the bag to receive the air filter, so that the air filter simply drops into the bag. The air filter is accordingly kept from falling out of the grill/slot/enclosure, the user's eyes and breathing are unaffected, and the dust and debris from the air filter are not spilled onto the floor or returned to the air.

In some implementations the adhesive which attaches the bag to the air filter may form a strong bond in order to keep the bag attached to the air filter (even as the bag is inverted and used to receive the air filter for disposal). In other implementations the adhesive may form a relatively weaker bond so that it keeps the bag in place when not in use but allows the user to fully separate the bag from the air filter when the user desires to use the bag to dispose of the air filter. In such an instance wherein the bag is fully removed from the air filter (by detaching it therefrom at the adhesive location) the bag does not need to be inverted to receive the air filter. In implementations the bag is not attached to the air filter with adhesive or any other attachment element, but the closure of the cover/flap itself simply holds the bag secure and in the collapsed configuration—the user opening the flap/cover to expose the bag and use it for disposal of the air filter.

There are a variety of air filter types, and the air filter apparatuses disclosed herein may include any type of air filter. FIG. 2, for example, shows an air filter apparatus (apparatus) 114 which includes a non-pleated air filter 115. The air filter 115 includes a non-pleated filtering medium 116 at least partially housed within a housing 117. The flap (cover) 118 is shown open to reveal the bag 120. The bag is attached to the air filter using an adhesive 122 which is illustrated with a dashed line to indicate that it is under the bag—the dashed line showing its location. The bag is seen to extend beyond the sides of the air filter and, indeed, the bag would have a size large enough to fully receive the air filter. Accordingly, the bag may be folded not only into an accordion fold but, additionally, may have sides that are folded inwards back towards the center of the top of the air filter to keep the bag compact with a small footprint (i.e., so that it is more easily fully covered with a flat flap/cover without the bag extending beyond the sides of the flap/cover). The bag of FIG. 2 is shown in a very simplified manner, without showing the accordion folds and such, for simplicity.

Figure 3:
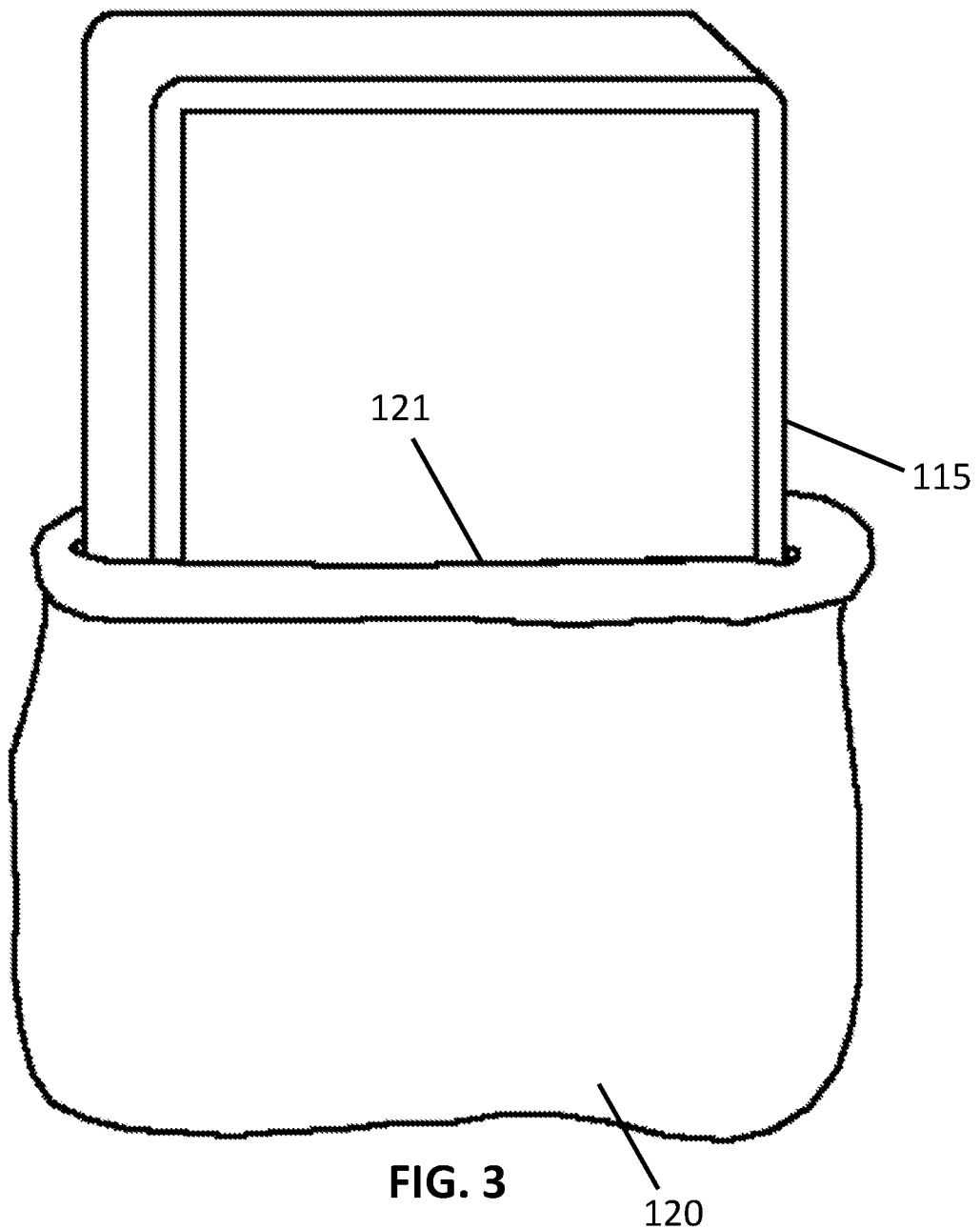
FIG. 3 is a front perspective view of the air filter apparatus of FIG. 2 during a bagging step.

FIG. 3 shows the air filter 115 being placed into the bag 120 (a "bagging" step). In this case the bag has been fully expanded and inverted and the air filter is being dropped into the bag. Although the words "drop" and "dropped" are used herein, this is not meant to convey that the air filter is placed in the bag in such a manner that dust particles or debris would be shaken loose and enter the air. Rather, the air filter may be carefully lowered into the bag and/or the bag gently pulled upwards over the air filter to prevent dust, debris, and the like from escaping. As seen in FIG. 3, the bag has an opening 121 and it is through this opening that the air filter is placed into the bag. Once the air filter is fully within the bag the bag opening may be closed, such as with a twist tie or by tying the bag closed, as is common with trash bags. The bag could additionally or alternatively have one or more pull string elements, as are common with kitchen trash bags, to help close and/or carry the bag. The bag could also or alternatively, in implementations, have one or more adhesive members near the opening to assist in securing the bag closed. For example the opening could be lined with one or more adhesive elements that are exposed by removing a covering in order to close the bag when desired (analogous to self-adhesive envelopes that commonly have a paper covering which is removed from an adhesive element when the envelope needs to be closed).

Figure 4:
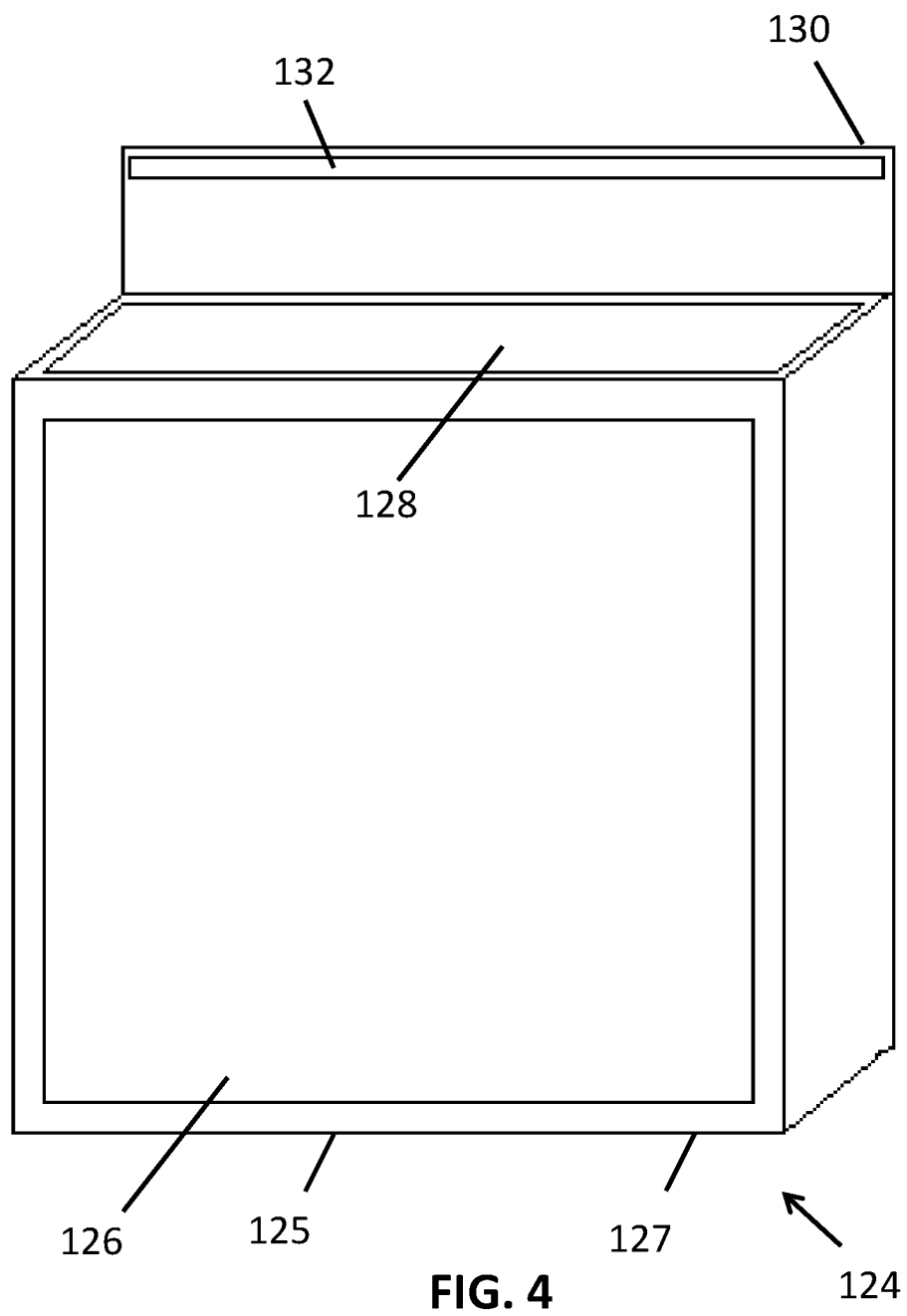
FIG. 4 is a front perspective view of another implementation of an air filter apparatus.

FIG. 4 shows an air filter apparatus (apparatus) 124. In this implementation the flap (cover) 130 is shown in an open configuration, and it is seen that there is an adhesive 132 on the underside of the flap (such as a tape strip or the like, though a strip of glue or another adhesive element could be used). This adhesive is used to secure the flap in a closed position, such as by securing the flap to the top of the air filter 125. The air filter 125 includes a filtering medium 126 at least partially housed within a housing 127. The items in FIG. 4 are not necessarily drawn to scale—in implementations the bag 128 when folded would not interfere with the flap being secured closed against the top of the air filter using the adhesive (the adhesive of the flap, in other words, in implementations would not contact the bag, but would contact the top of the air filter). In FIG. 4 the bag is secured to the top of the air filter using an adhesive, though for ease of viewing the other elements the adhesive securing the bag to the top of the air filter is not shown. The bag is folded down on the top of the air filter but for ease of illustration it is shown in a simplified format.

Figure 5:
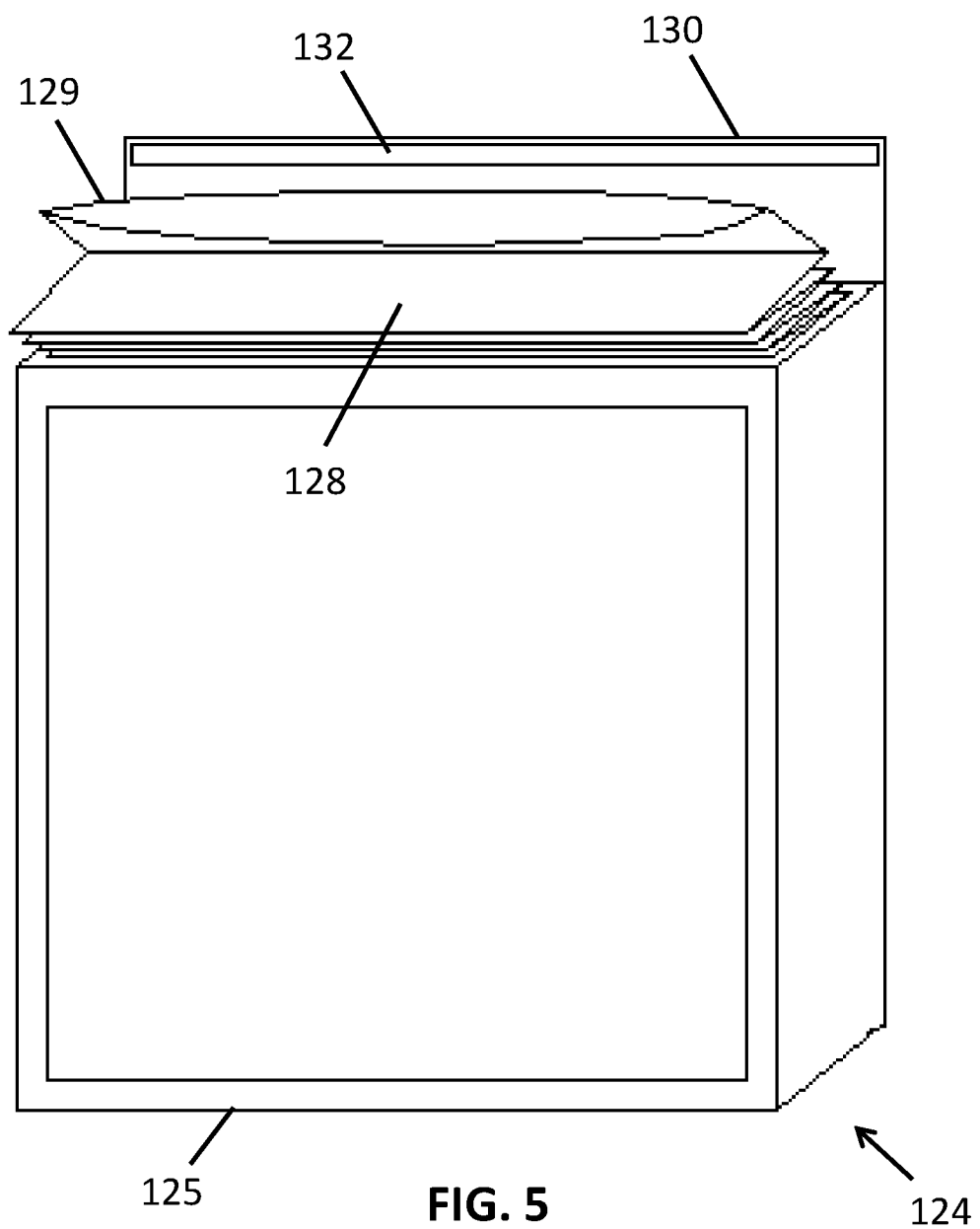
FIG. 5 is a front perspective view of the air filter apparatus of FIG. 4 during a bag expansion and opening step.

FIG. 5 shows the air filter apparatus 124 but with the bag 128 beginning to be pulled upward and opened. The bag opening 129 is shown in FIG. 5 as well, and the accordion fold of the bag can be seen.

Although the use of adhesives is discussed throughout this disclosure as a mechanism for coupling a bag to an air filter and for securing the flaps/covers closed, it is pointed out that in implementations other coupling/securing mechanisms could be used. For example an end of the bag could be stapled to the top of the air filter (but in a way which does not allow, or does not allow much, exit from the bottom of the bag of dust and the like), or the flap could be stapled in the closed configuration (but in a manner which allows the flap to be opened manually), and so forth.

In addition to, or alternative to, the flaps/covers discussed thus far, a removable or openable/tearable cover could cover the bag. The cover could, for example, be a paper or plastic element with a tear-away portion that is removed to expose the bag, or it could be a paper or plastic element that is adhesively or otherwise secured closed (and/or secured to the air filter) and which may be removed/opened manually (or a portion of it removed/opened manually) to expose the bag. For example, the cover could simply be a tape strip which secures the bag to the air filter and could either be also taped to the bag (in a way that does not interfere with removing the bag and/or opening it for disposal of the air filter) or the tape strip could include a portion without adhesive so that the tape strip is adhered to the top of the air filter but not to the bag (the bag being located under or proximate the non-adhesive portion). In either case, once the bag is exposed, it may be expanded from its folded configuration and the bag opening opened, to prepare for disposal of the air filter.

Although the bags are disclosed herein as being folded, in some cases they could simply be scrunched up, rolled up, or otherwise in a compact configuration and not necessarily in a neat, folded configuration, so long as the bag can be easily opened and expanded for disposal of the air filter.

Although FIGS. 4-5 do not show it, the bag itself may be attached to the top of the air filter such as with an adhesive, similar to what is described above for other versions. In other implementations the bag could be enclosed within (or secured by) the flap but the bag could be loose therein (i.e., not fixedly attached to the air filter or the flap), so that once the flap is open the bag may be fully removed from the air filter and used to receive and dispose of the air filter.

FIGS. 4 and 5 show the bag on the top of the air filter (i.e., it is glued thereto), but in implementations the bag could be adhered to the underside of the flap, instead of to the top of the air filter. In implementations the bag and flap could be on the bottom or one of the sides of the air filter with the bag being attached to the air filter, or to the underside of the flap, or to neither (but secured by the flap).

Figure 6:
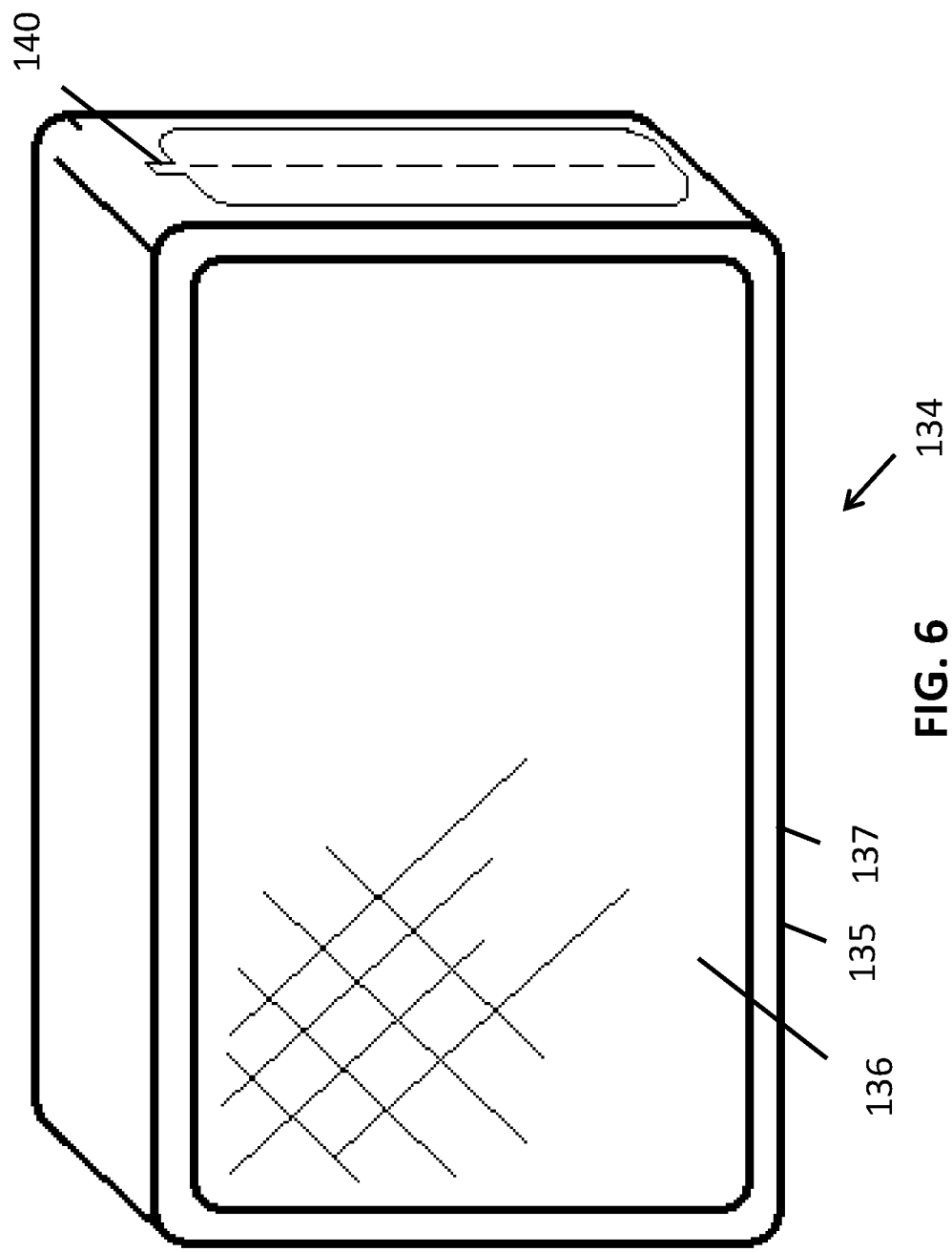
FIG. 6 is a front perspective view of another implementation of an air filter apparatus.
Figure 7:
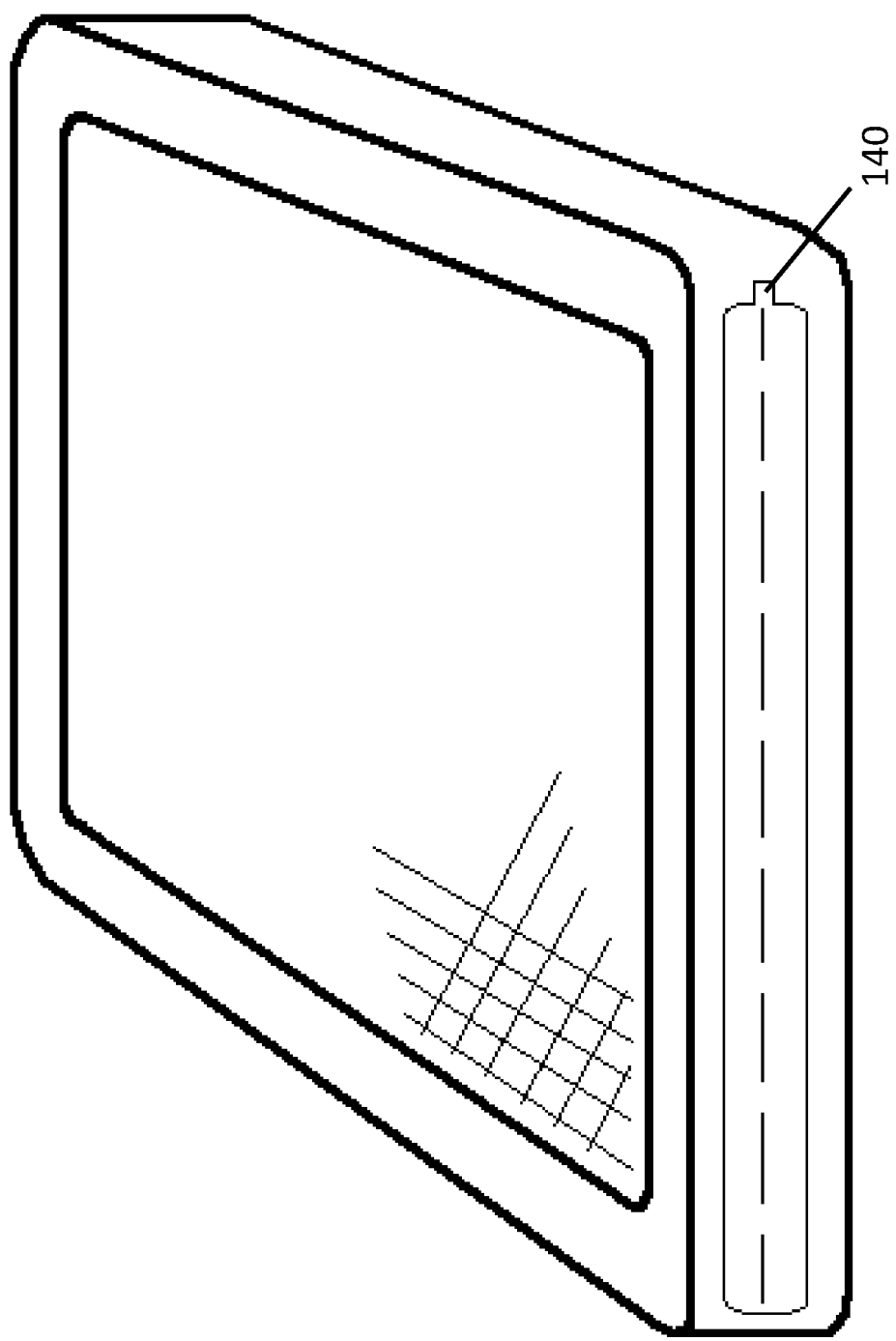
FIG. 7 is a top perspective view of the air filter apparatus of FIG. 6.
Figure 8:
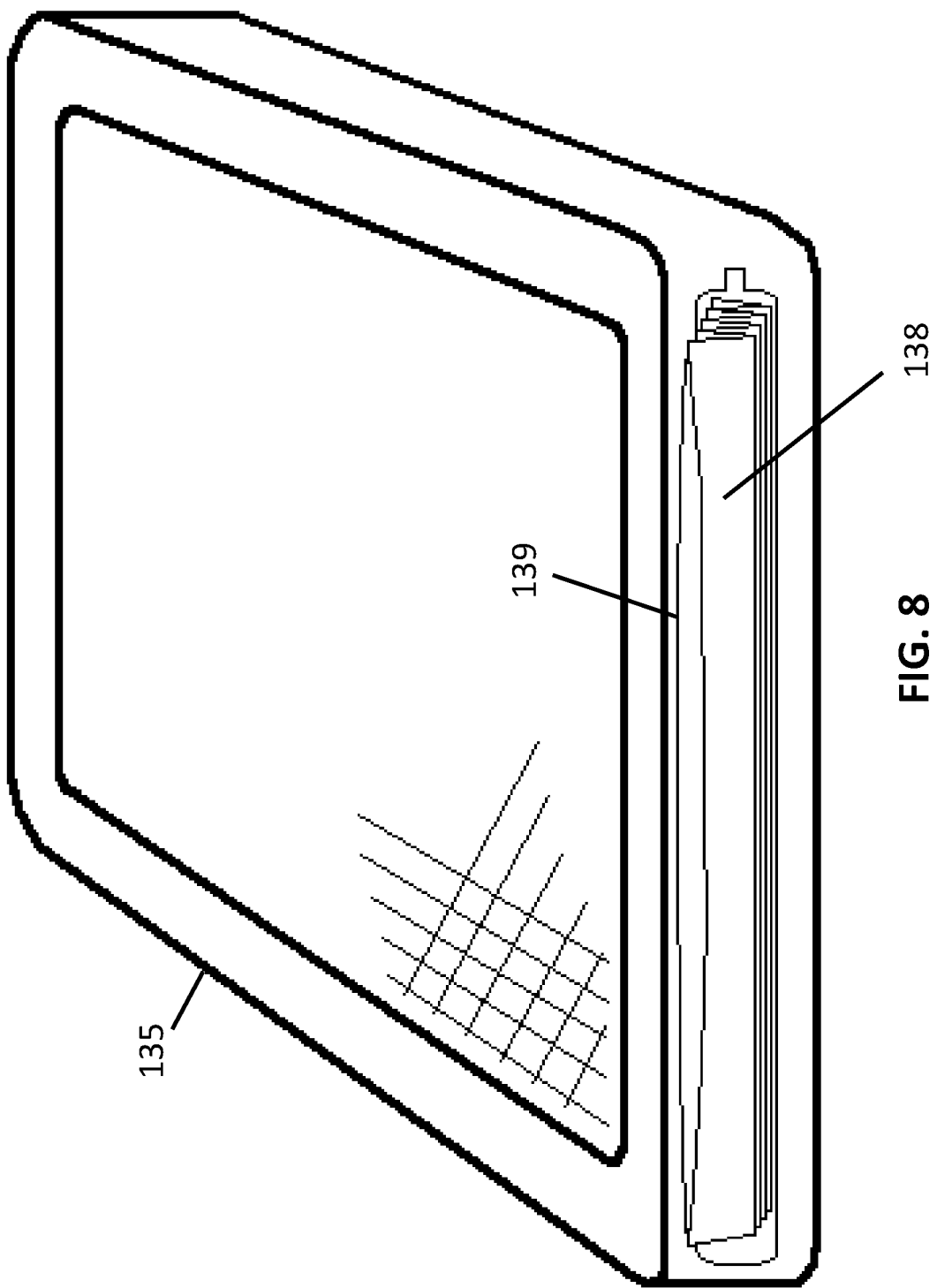
FIG. 8 is a top perspective view of the air filter apparatus of FIG. 6 during a bag expansion and opening step.
Figure 9:
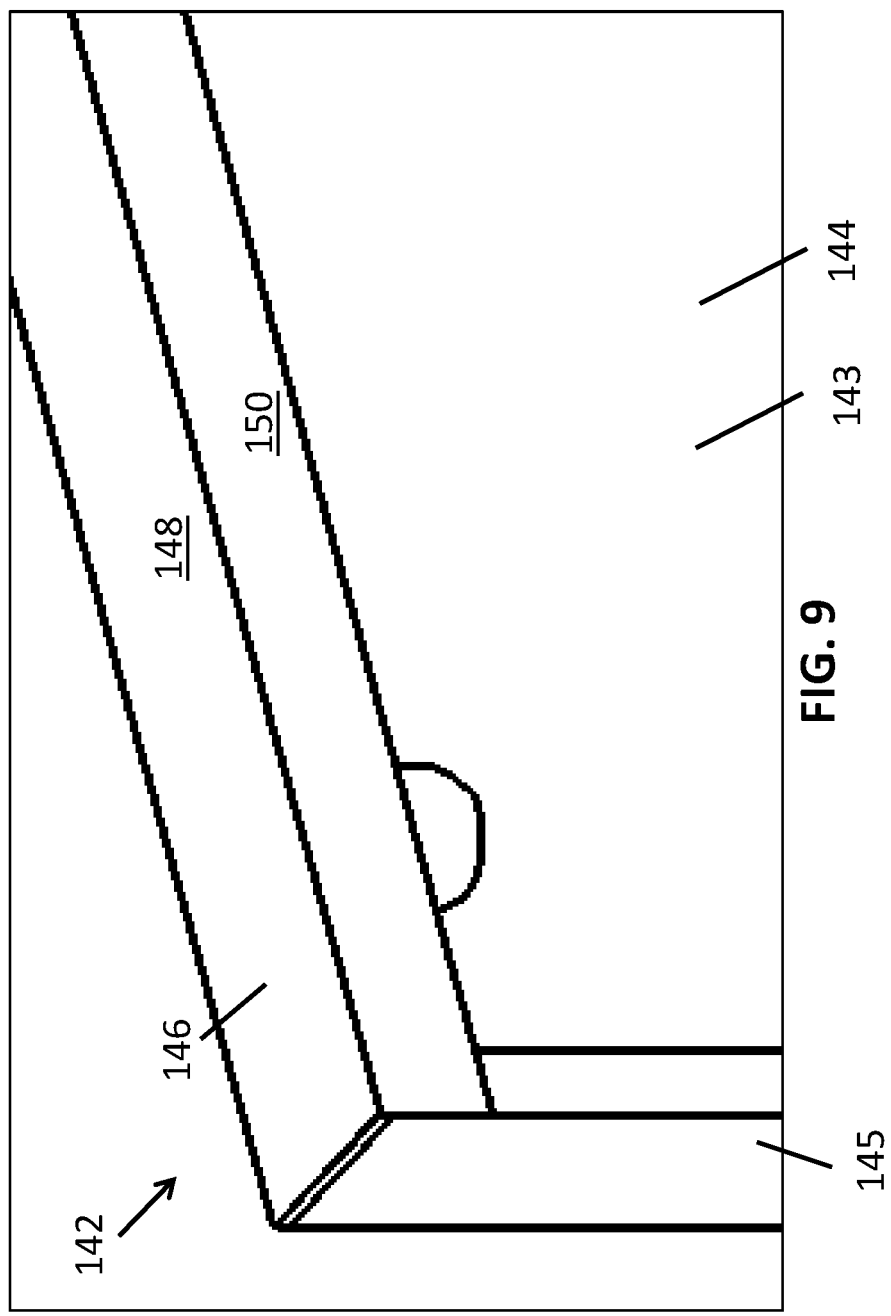
FIG. 9 is a top perspective close-up view of elements of another implementation of an air filter apparatus.

FIGS. 6-8 show an air filter apparatus (apparatus) 134 that has a bag 138 accessible by removing a pull strip (cover) 140. FIG. 6 shows a front perspective view and FIG. 7 shows a top perspective view (the views not necessarily drawn to scale relative to one another), both with the pull strip intact. FIG. 8 shows a top perspective view with the pull strip removed, the bag being pulled out, and the bag opening 139 beginning to be opened for disposal of the air filter 135. The air filter 135 includes a filtering medium 136 at least partially housed within a housing 137. The pull strip could be formed of a polymer or paper or cardboard or cardboard-like element. For example, it could be similar to removable cardboard elements used on the top of a facial tissue boxes for exposing facial tissues. In such implementations the removal of the pull-strip could be facilitated by perforations or slits along its perimeter (not visible in FIG. 7, but existing along the perimeter of pull strip 140 which is visible) which help to separate (or tear) it from the air filter to form an opening exposing the bag. In other implementations a pull strip could be formed of a stronger material than surrounding material covering the bag so that, when the pull strip is pulled, the pull strip itself forms an elongated tear in the covering material (even without the use of preexisting perforations), forming an opening for removal of the bag. This would be analogous to, for example, a pull strip on a mailed package or rigid envelope which may be pulled to open the package or envelope, and/or it may be analogous to a pull strip on a wax encasing for cheese which may be pulled to form a slit in the wax encasing for removal of the cheese.

FIGS. 9-12 show an air filter apparatus (apparatus) 142 with a flap (cover) 146 that has a top portion (top) 148 covering the bag 154 and a front portion (front) 150 which folds over. The folded front portion 150 could be secured to the front of the air filter 143, such as with an adhesive 156 or staple(s) or other securing mechanism, to secure the flap closed, but in a manner which allows for manual opening of the flap to expose the bag. The bag could be adhered to the top of the air filter as with other versions. The air filter 143 includes a filtering medium 144 at least partially housed within a housing 145.

Figure 10:
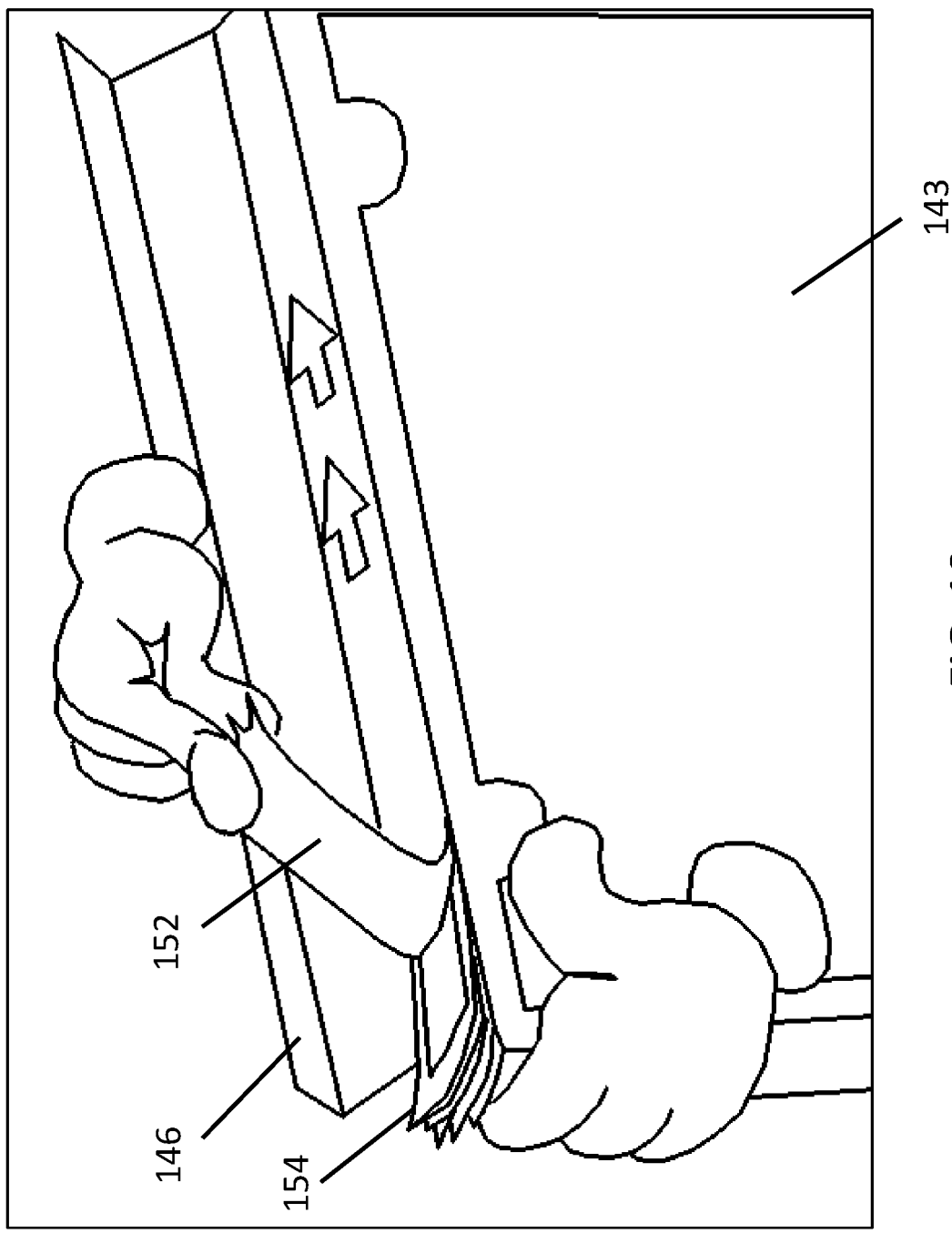
FIG. 10 is a top perspective close-up view of elements of the air filter apparatus of FIG. 9 during a bag exposure step.
Figure 11:
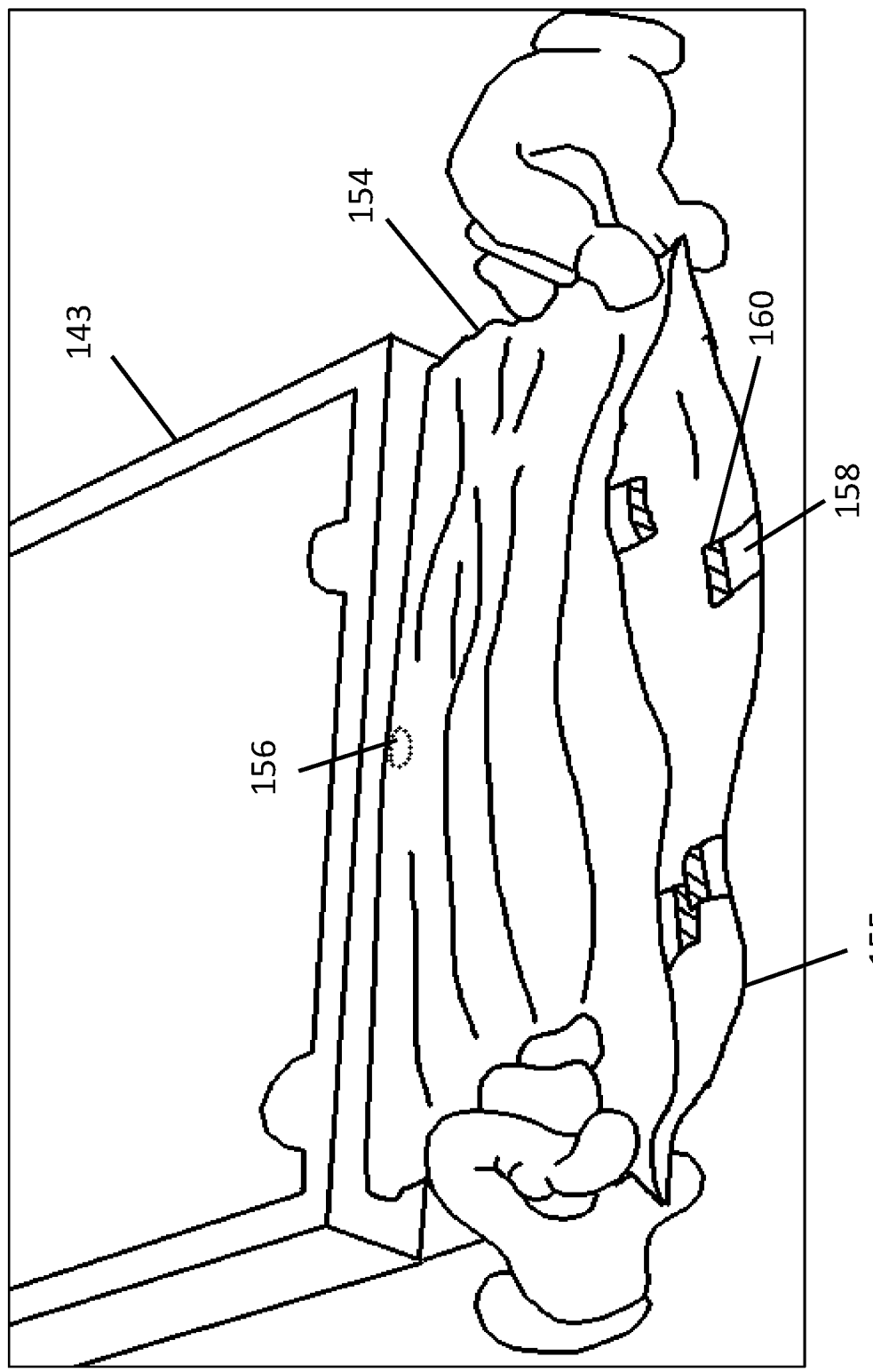
FIG. 11 is a top perspective close-up view of elements of the air filter apparatus of FIG. 9 during a bag expansion and opening step.

In implementations the bag could be covered only by the flap itself, but in FIG. 10 it is seen that in implementations there is also a pull strip (cover) 152 securing the bag in a folded configuration (FIG. 10 shows a "bag exposure" step as the pull strip is being pulled away). The pull strip in this case is secured to the top of the air filter using an adhesive (which may be on the pull strip itself or the top of the air filter), and the pull strip may be manually pulled to remove it and to expose the bag. The adhesive which secures the pull strip to the top of the air filter may be positioned in such a way that none of it comes in contact with the bag or so that removal of the pull strip does not pull the bag itself (and so that the bag is not hindered from being expanded and opened by the adhesive which secured the pull strip). In other implementations the pull strip may be adhered to the bag as well so that pulling it also pulls (or begins to pull) the bag to an expanded configuration. The bag may be secured to the top of the air filter with an adhesive 156 or staple or other securing mechanism. In FIG. 11 the adhesive 156 is shown in dashed lines because it is between the bag and air filter, the dashed lines showing its location.

In FIG. 11 the pull strip has been removed and the bag is being pulled away from the air filter to expand and open it. Proximate the opening 155 of the bag are seen several closure members 158, which in this example are tape strips each having a removable portion 160 for exposing an adhesive. The tape strips are seen to be inside the bag. The bag is inverted inside-out, however, once it is fully opened/expanded. FIG. 12 shows the bag after it has been inverted, and shows the bag being pulled over the air filter (or the bag simply being held while the air filter drops therein) for disposal of the air filter (FIG. 12 accordingly shows a "bagging" step). Once the air filter is fully within the bag, the removable portions may be removed from the tape strips and the adhesive portions of the tape strips may be used to help secure the bag in a closed configuration to help keep dust, debris, and the like from exiting the bag. Although several tape strips are shown, in implementations there could simply be one tape strip in the center of the opening and this could be enough to securely close the bag shut and to keep dust and debris from exiting the bag. Even if no tape strip is included, the user may be able to simply fold over the top of the bag to keep dust and debris from exiting therefrom while carrying the bagged air filter to the trash. Other closure members could be coupled with the bag instead of tape strips, such as tie members, a cinching member, and so forth.

In implementations the bag opening may be opened with the user's finger(s) and thumb as it is being pulled away from the air filter (such as by sliding the thumb and opposing finger(s) relative to one another), and the bag may be easily expanded and pulled away from the air filter manually by pulling on both corners of the bag at the same time (or at a different time) using the thumb and finger(s) of each hand, as representatively illustrated in FIG. 11.

Air filters come in a variety of sizes, thicknesses, shapes, configurations, and so forth, and the air filter apparatuses disclosed herein, and the related methods, may use any air filter type. In other words, the bags, bag covers, flaps, adhesives, adhesive strips, and so forth, may be implemented on any air filter type.

In FIG. 10 the bag and pull strip are shown coupled with the top of the air filter, but in other implementations they could be coupled with the inside/underside of the flap, instead. In such an implementation closure of the flap (as in FIG. 9) would place the cover/pull strip in a non-exposed configuration, whereas opening the flap (as in FIG. 10) would expose the cover/pull strip so that it could be removed to expose the bag.

As disclosed previously (e.g., with regards to FIGS. 1A-1C) the existing flap on an air filter housing may be used to secure a bag but, instead of folding the flap over onto the front or back of the air filter (or into a gap to secure the flap closed), the flap could be folded backwards upon itself creating an accordion-type fold at the top of the housing, as seen in FIG. 1C. Within that fold a thin mil bag could be adhered or attached with glue or staples or another attachment mechanism (or the bag could simply be secured therein by the closure of the flap itself without any attachment/adhesion) and the flap could be sealed closed to itself with an adhesive tear strip, an adhesive element, an easy-open tab element, staples, or another securing/attachment mechanism. Alternatively, when the housing is produced the end of the flap could be slightly longer so that it is long enough to fold over onto the front or back of the air filter but then also fold back upon itself, as seen with the flap (cover) 164 of air filter apparatus 162 illustrated in FIG. 12A. If the flap is long enough, it could further be folded back onto the top of the air filter as well, as seen with the flap (cover) 170 of air filter apparatus 168 illustrated in FIG. 12B. If the flap is only long enough to have an accordion fold on the front or back of the air filter (as in FIG. 12A), the bag could be placed at location 166 within the front/back fold. If the flap is long enough to have an accordion fold on the front or back of the air filter and also a fold back onto the top of the air filter, as in FIG. 12B, the bag could be placed at location 172 within the front/back fold or at location 174 under the top fold. In either case, the bag in the collapsed configuration resides entirely within the folded flap, and may or may not be adhesively or otherwise attached to the flap (such as the bottom center of the bag being attached with an adhesive but leaving the rest of the bag free). Bags and adhesive(s) are not shown in FIGS. 12A and 12B for ease of viewing the other elements.

Figure 12B:
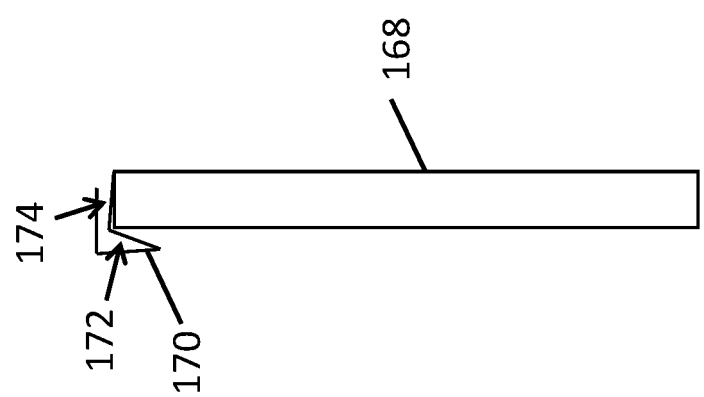
FIG. 12B is a side view of components of another implementation of an air filter apparatus.

One advantage of using the configuration of FIG. 12A (with the flap having two folds) is that it uses less material than the FIG. 12B version but still covers the bag and allows the flap to be secured to the front (or back) of the air filter in addition to the top of the air filter. One advantage of using the configuration of FIG. 12B (with the flap having three folds) is that it allows the flap to be secured to the front (or back) of the air filter in addition to the top of the air filter and allows the bag to be at the top of the air filter for easier opening of the bag in some circumstances (such as in a circumstance wherein the top of the air filter apparatus is exposed by opening an HVAC slot/door/opening or the like to remove the air filter apparatus). Covering the bag with the flap as in FIGS. 12A and 12B, and covering the bag in the other ways disclosed herein, can prevent the bag from acquiring dust. In implementations wherein the bag is on the front or back of the air filter, it could be placed in a way so that it does not obstruct airflow and installation/removal of the air filter, and in all implementations disclosed herein the flap or other covering of the bag protects the bag from collecting dust and the like, so that it stays clean until use. Thus, when the bag is exposed to be used, there is little or no dust on the bag itself, further reducing dust/particulate scattering during bagging of an air filter.

Many mechanisms are available to secure the bag to the air filter, to keep the bag in a closed configuration, and to later expose the bag for disposal of the air filter. Any type of tear strip or pop-open mechanism may be used for exposing the bag.

As would be understood from the drawings, when the bag is in the folded or collapsed configuration it does not interfere with air flow or with the filtering function of the air filter.

Figure 13:
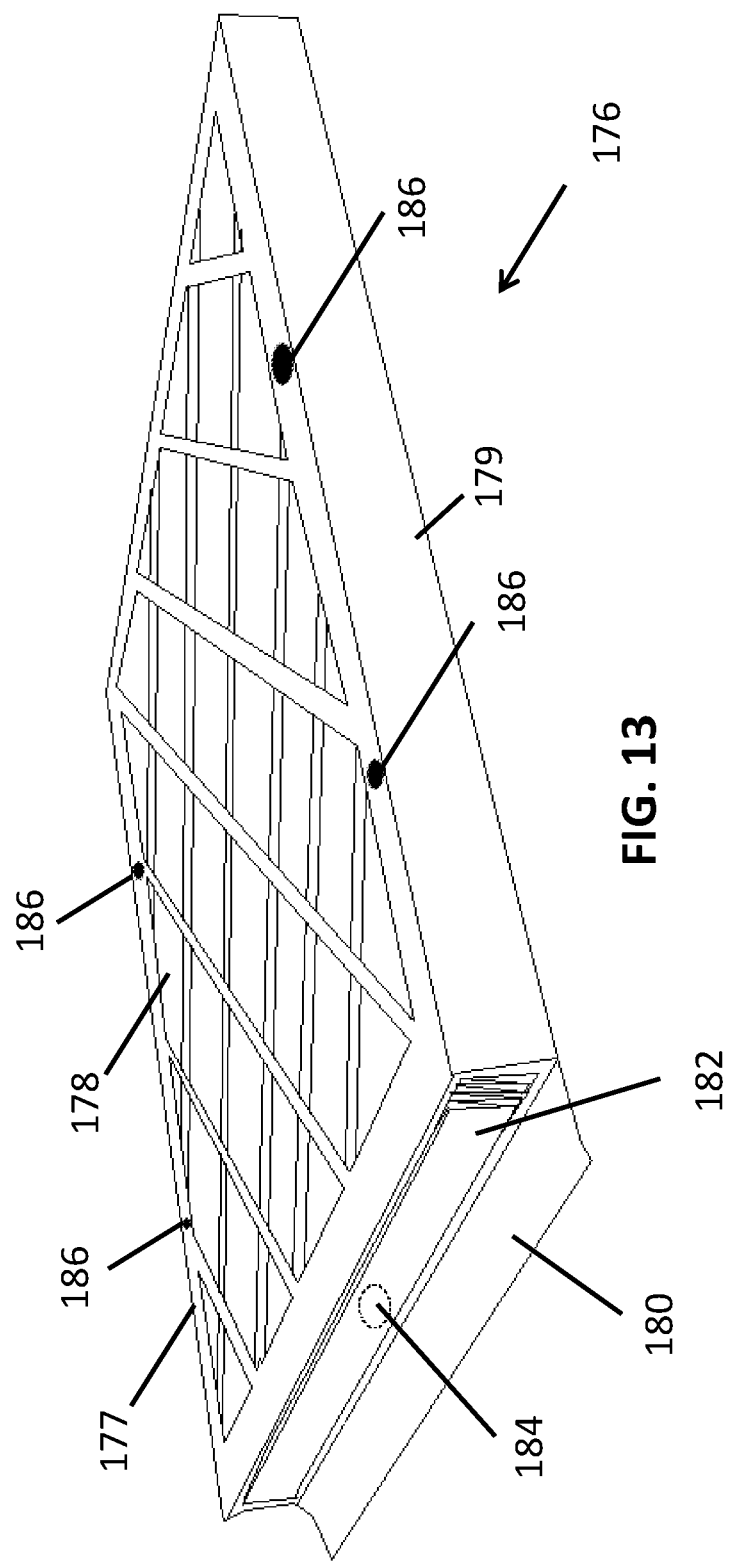
FIG. 13 is a side perspective view of another implementation of an air filter apparatus.

Referring now to FIG. 13, another version of an air filter apparatus (apparatus) 176 is shown. This version is similar to the version of FIG. 1 except that four magnets 186 are included along the front the air filter 177 to facilitate coupling the air filter within a metallic slot or compartment. The air filter 177 includes a filtering medium 178 at least partially housed within a housing 179. The magnets could be micro-magnets and could be metallic, formed of a polymer/magnet composite, an organic polymer, a ceramic, and so forth. As an example they could be formed of neodymium or another type of strongly magnetic material so that they can be strong notwithstanding being very small. The magnets could be adhered to the air filter with an adhesive, and may assist with easy biasing of the air filter to keep it situated in an HVAC slot or compartment or the like by attraction of the magnets to a magnetizable metal portion of the slot or compartment. This may especially be useful for slots/compartments that open downward so that when the user opens/exposes the slot the air filter does not automatically tend to drop out of the slot due to gravity but, rather, must be manually pulled down by the user to overcome the magnetic attachment. Notwithstanding this example, the magnets could be used on any air filters regardless of the position or location of the opening providing access to the slot or compartment in which the air filter resides when in use. The magnets can be placed on a face of the air filter so that the air flow tends to push the magnets against a sidewall of the slot/compartment nearest the magnets, not away from said sidewall, so that the airflow tends to support the magnets being magnetically coupled with the sidewall/metal component. Any of the other air filters disclosed herein could include magnets similar to the FIG. 13 version, but they could also exclude the magnets. Air filter apparatus 176 is seen to also include a flap (cover) 180 and a bag 182 which is exposed by opening the flap, the bag being secured to the air filter using an adhesive 184 (shown in dashed lines to indicate its location since the adhesive is between the bag and filter).

Figure 14:
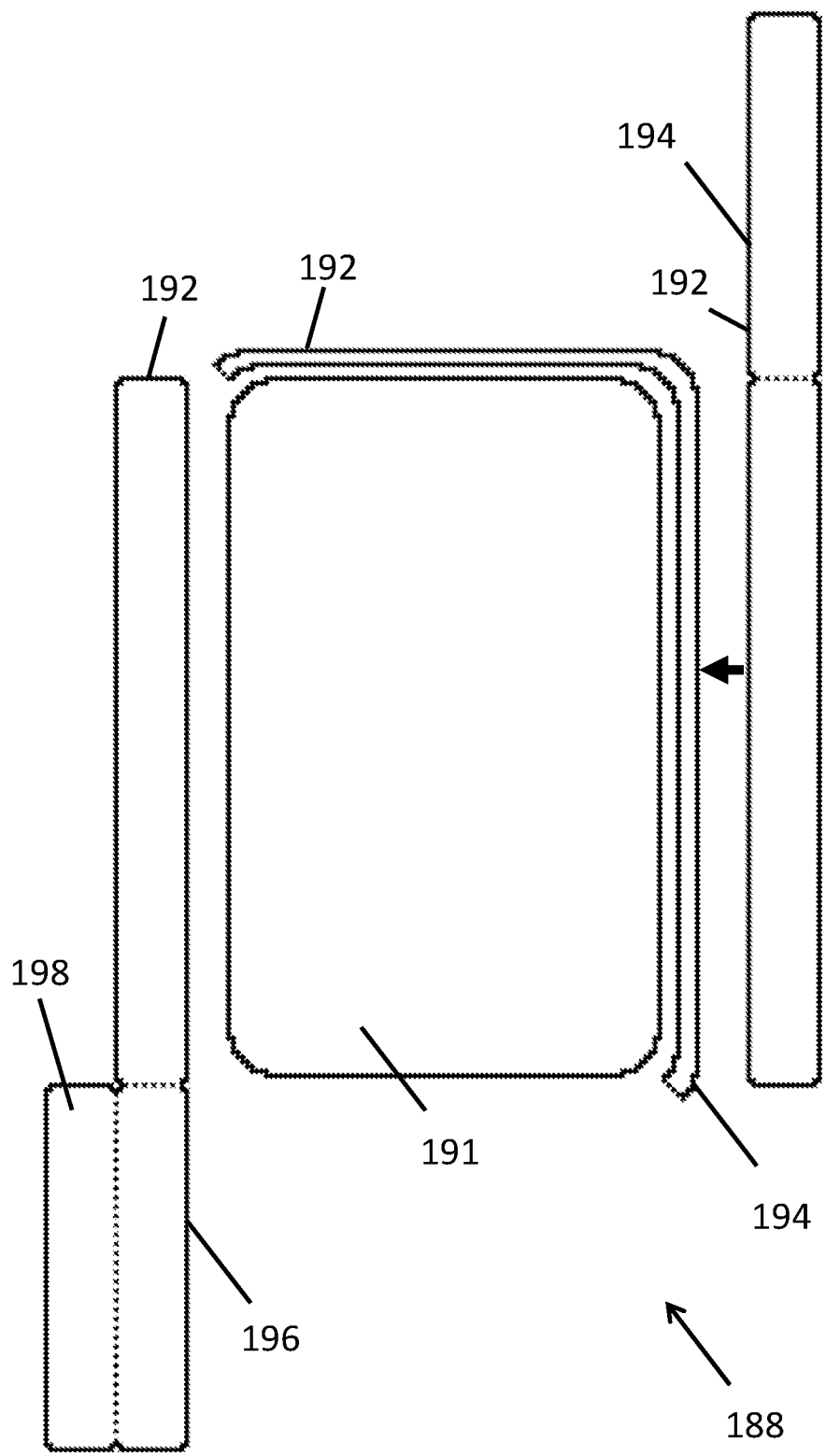
FIG. 14 shows front and side views of components of another implementation of an air filter apparatus.
Figure 15:
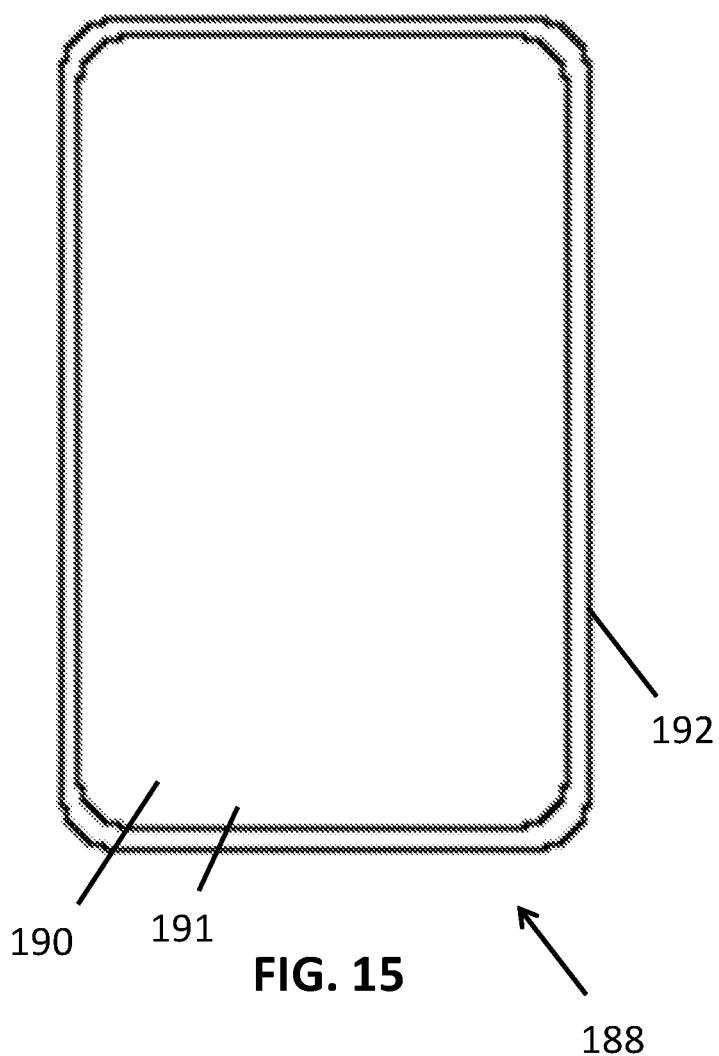
FIG. 15 is a front view of the air filter apparatus of FIG. 14.
Figure 16:
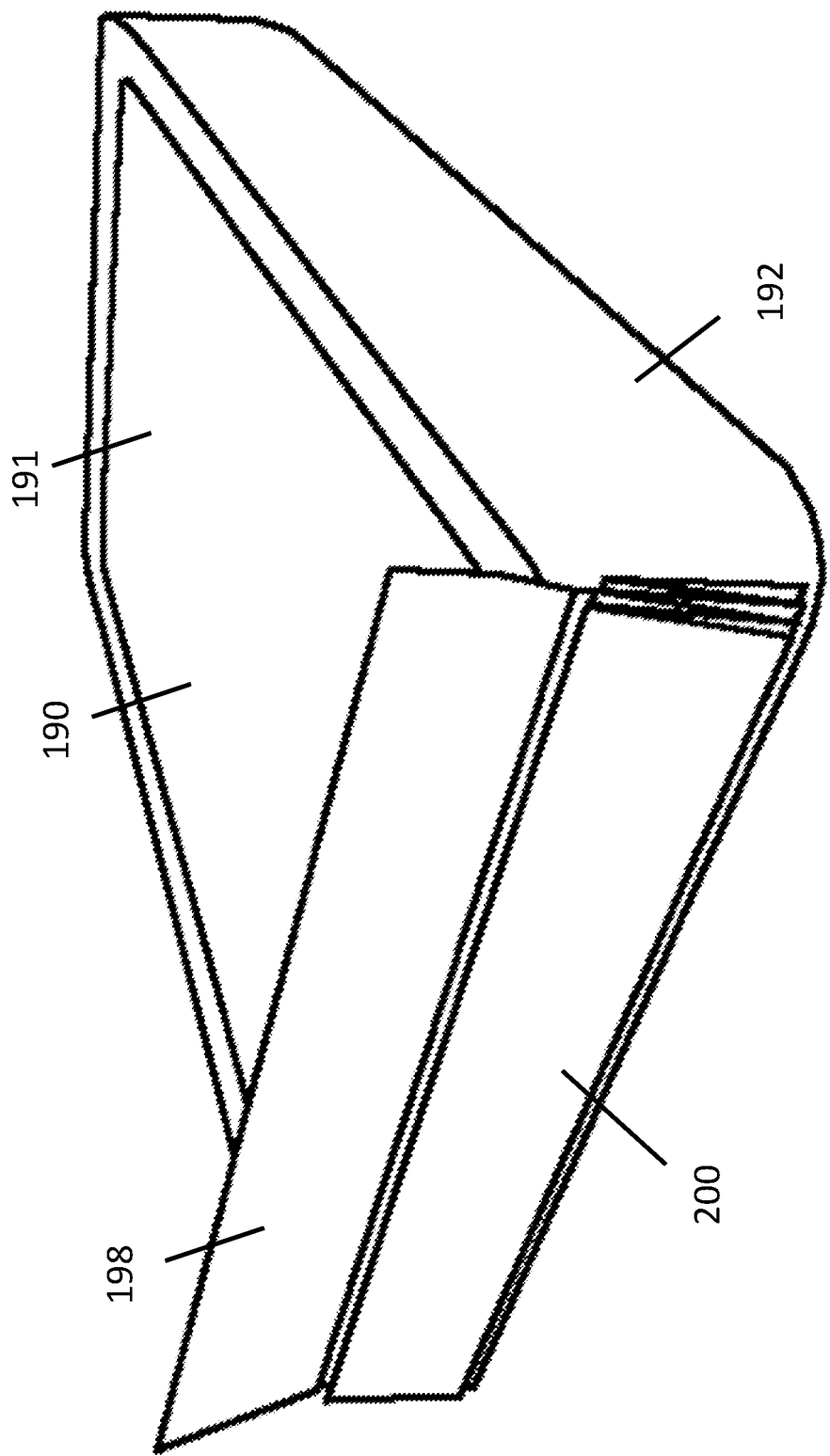
FIG. 16 is a top perspective view of the air filter apparatus of FIG. 14 with a flap (cover) open to expose a disposal bag.

FIGS. 14-16 show another implementation of an air filter apparatus (apparatus) 188 which includes an air filter 190. The air filter 190 includes a filtering medium 191 coupled at least partially within a housing 192. The housing is formed of a first housing element 194 and a second housing element 196. In FIG. 14 the first housing element is shown twice only to show what it looks like when laid flat (rightmost image) and what it looks like when rotated, folded and placed proximate the air filter to be coupled thereto. The second housing element 196 is also shown flat and is not shown rotated, folded and placed proximate the air filter to be coupled thereto, but in the flat configuration the flap (cover) 198 can clearly be seen. The dotted lines of housing elements 194 and 196 indicate about where the housing elements are bent (in a rounded fashion) to at least partially house the filtering medium and where housing element 196 is folded to form the flap. FIG. 15 shows the air filter apparatus 188 in an assembled configuration with the housing 192 at least partially enclosing the filtering medium 191. The housing elements 194 and 196 could be coupled with the filtering medium using an adhesive, staples, or any other coupling mechanism. FIG. 16 shows the flap 198 in an open configuration, exposing a bag 200 which may be coupled to the air filter such as using an adhesive or staple(s) or any other coupling mechanism (or it may sit loosely under the closed flap to be removed when the flap is opened). The bag may be used for disposal of the air filter, and the flap may initially be secured closed using an adhesive or staple(s) or other securing mechanism, as with other air filter apparatuses disclosed herein.

Figure 17:
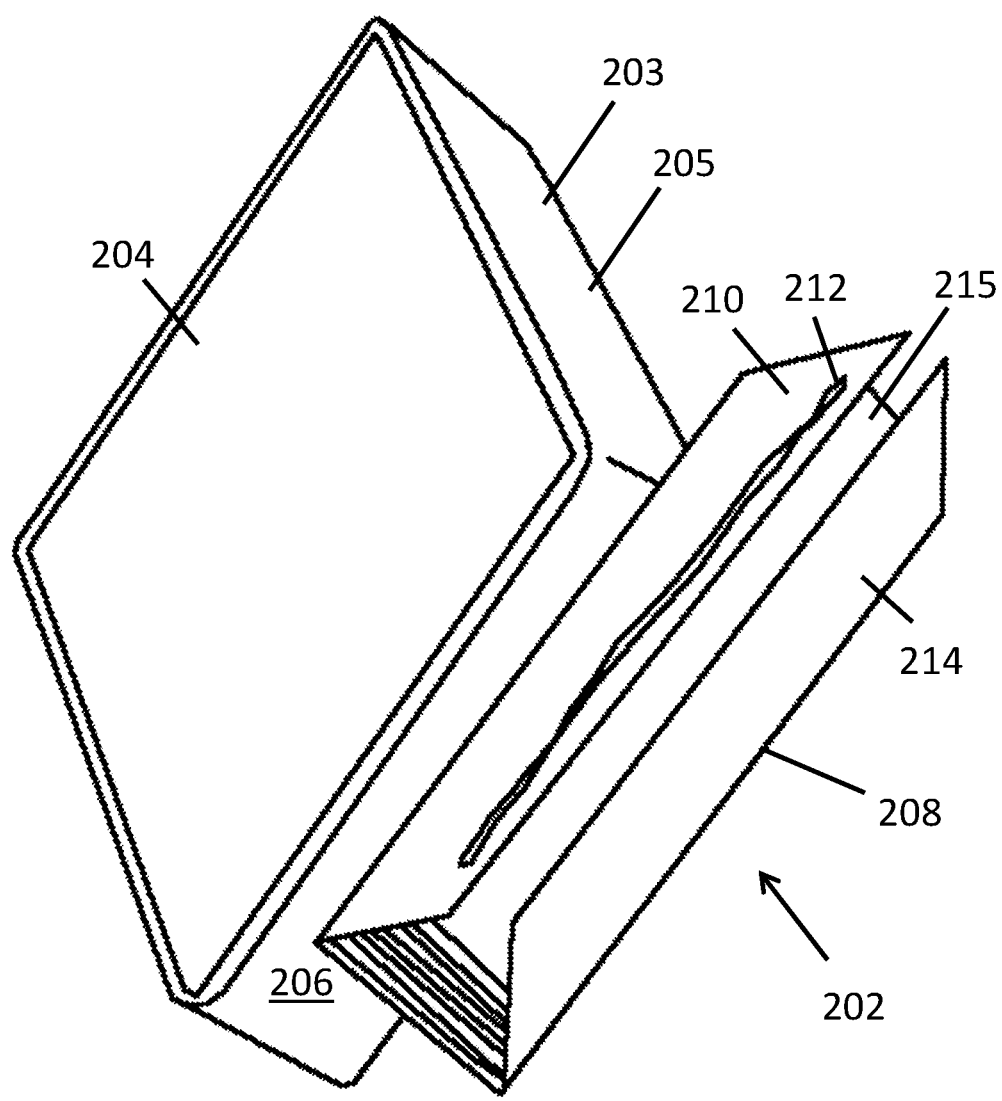
FIG. 17 is a top perspective view of components of another implementation of an air filter apparatus in a partially disassembled configuration.
Figure 18:
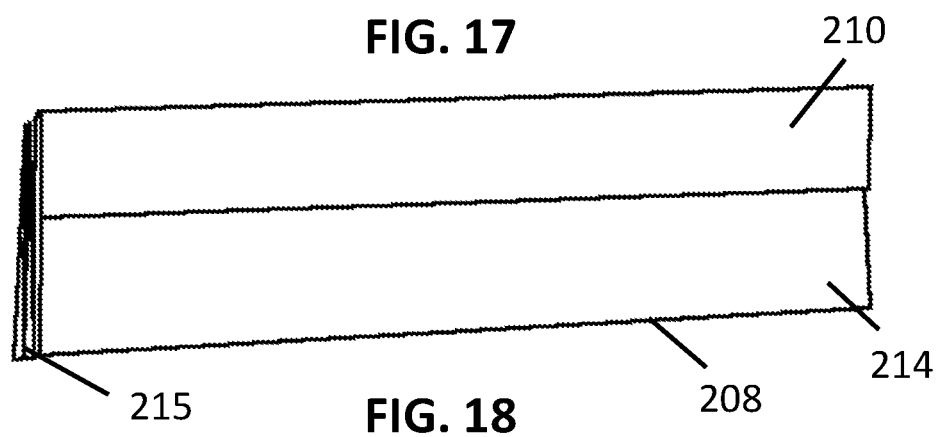
FIG. 18 is a top perspective view of a bag holder of the air filter apparatus of FIG. 17.

FIGS. 17-18 show another implementation of an air filter apparatus (apparatus) 202 which includes an air filter 203 and a bag holder (cover) 208. The air filter 203 includes a filtering medium 204 at least partially housed within a housing 205. The bag holder is coupled at a surface 206 of the air filter, such as using an adhesive applied to surface 206 of the housing and/or an underside of the bag holder (not seen) and coupling the bag holder and air filter together (or staples or another coupling mechanism could be used). The bag holder includes a first flap (cover) 210 and a second flap (cover) 214 which at least partially cover a bag 215 when in a closed configuration (as in FIG. 18). In FIG. 17 the bag holder is in a partially open configuration so that the bag is exposed. An adhesive 212 on the first flap (or another coupling mechanism) is used to hold the bag holder in a closed configuration when not in use (as shown in FIG. 18). In the figures the second flap overlaps over the first flap to couple with the adhesive 212 to form the closed configuration. In other implementations the first flap could overlap over the second flap and/or the adhesive could be located on the second flap—any configuration is possible so long as the adhesive or other coupling mechanism selectively keeps the flaps closed and can be manually opened.

Figure 19:
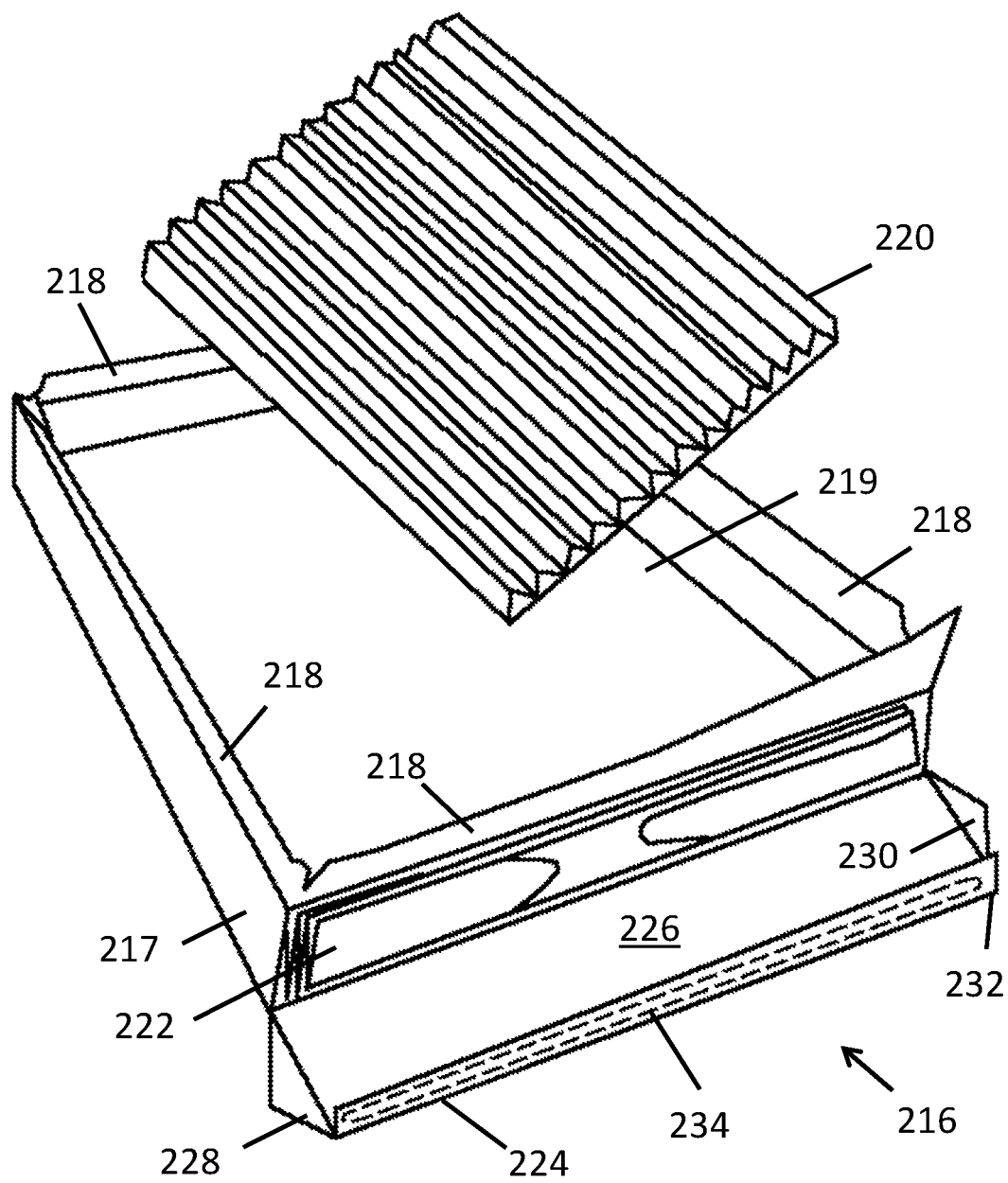
FIG. 19 is top perspective view of components of another implementation of an air filter apparatus in a partially disassembled configuration.

FIG. 19 representatively illustrates another implementation of an air filter apparatus (apparatus) 216. In this implementation a filtering medium 220 couples within a cavity 219 of a housing 217 to form an air filter (these elements are not drawn to scale, as the filtering medium would fit snugly within the housing in practice). Flaps 218 of the housing may be folded downward and/or secured to one another and/or to the filtering medium to secure the filtering medium in place. The housing in implementations could be made, by non-limiting example, of a cardboard or cardboard-like element. The flaps 218 could also be made of a cardboard or cardboard-like element and may be secured to one another and/or to the filtering medium in the closed configuration using an adhesive, staples, or any other coupling mechanism. In other implementations the flaps 218 could be formed of a metallic element such as a thin aluminum and may be manually bendable to the closed and open configurations, such as to remove and replace the filtering medium as desired. In FIG. 19 the housing is shown with the flaps 218 in an open configuration for removing an old filtering medium and/or installing a new filtering medium. In implementations the flaps 218 are glued/adhered in a way that they are not meant to be opened again, and for such implementations FIG. 19 representatively illustrates manufacturing of the air filter apparatus, including placement of the filtering medium at least partially within the housing during initial manufacturing of the air filter apparatus.

Air filter apparatus 216 further includes a bag 222 coupled with the air filter. The bag 222 in the shown implementation is attached to the housing using an adhesive, but in other implementations it could be stapled or secured to the housing using any other coupling mechanism, or it could not be attached/adhered but just held in place (and held collapsed) by the flap 224 (discussed below). Bag 222 is used for disposing of the air filter, as with other air filter apparatuses disclosed herein.

A flap (cover) 224 is coupled with the housing 217 and is used to cover the collapsed bag when the bag is not in use. Flap 224 includes a top portion 226 (which closes over the bag itself), a first side portion 228 and second side portion 230 that may be adhered to sides of the housing such as using an adhesive or other coupling mechanism, and a front portion 232 which may be secured to a front of the housing using an adhesive 234 (adhesive 234 is shown in dashed lines because, in the drawing, it is behind the front portion and so not actually visible—the dashed lines indicate its location however on the non-visible side of the front portion). In implementations the side portions 228/230, instead of being adhered or attached to sides of the housing, may be tucked into corresponding slots or openings formed by the housing. In the implementation shown they act as supporting wings to keep flap 224 closed (until the user desires to use the bag) and are secured to sides of the housing such as using an adhesive or any other coupling mechanism. In some implementations the side portions 228/230 may be excluded altogether.

When a user desires to use bag 222, the user may open the flap 224 to expose the bag, such as by decoupling the front portion 232 from the front of the housing and/or by decoupling the side portions 228/230 from the sides of the housing, such as by using manual force to break adhesive seals. The bag may then be expanded and inverted inside-out to receive the air filter. In implementations the bag will not be adhered to the housing 217 and the bag in such cases need not be inverted (turned inside out) to receive the air filter. The bag may have a pull tab or other attached element coupled to it to help pull it away from the housing and/or to help open the bag. The bag may have an accordion fold, as with other bags disclosed herein and as illustrated in FIG. 19, or any other form of collapsed configuration.

Figure 20:
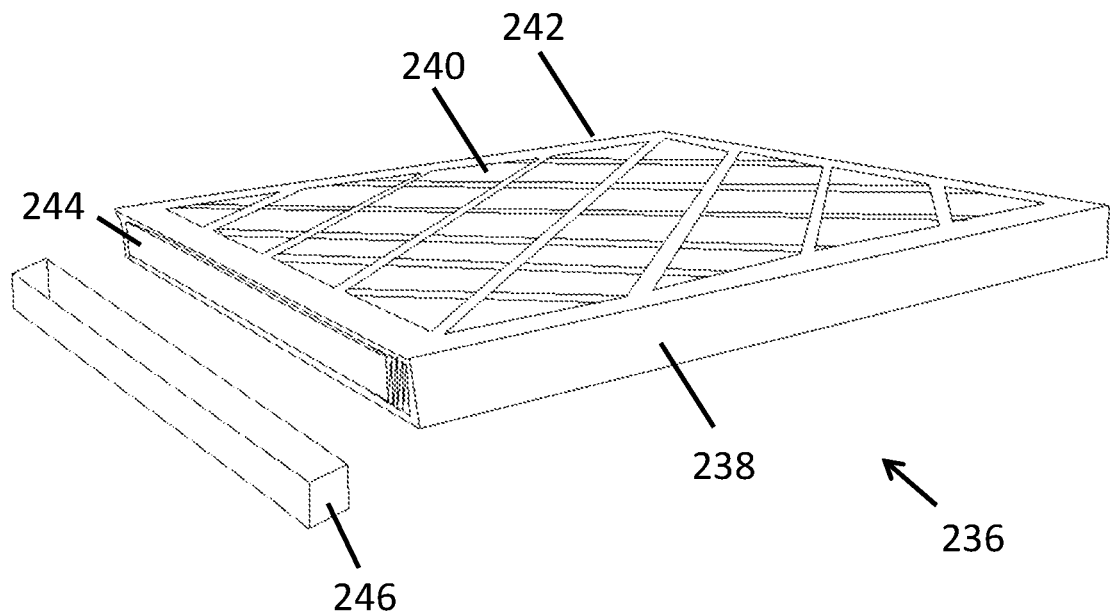
FIG. 20 is a side perspective view of another implementation of an air filter apparatus in an opened configuration.
Figure 21:
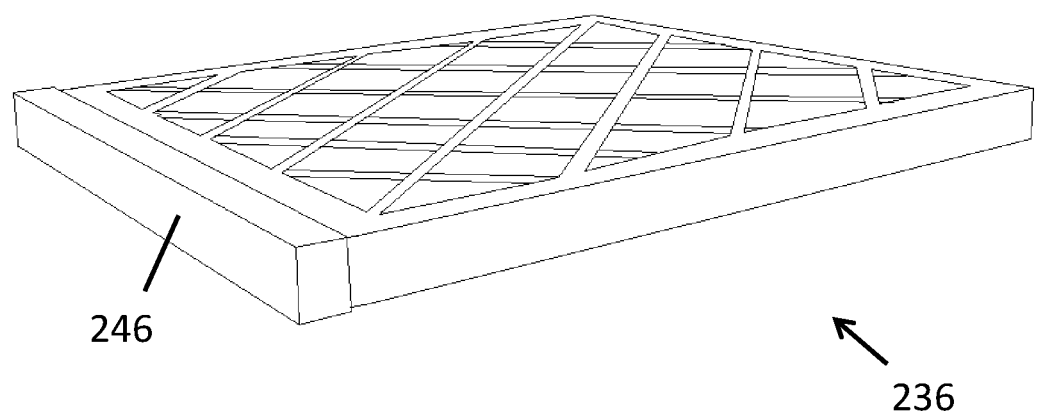
FIG. 21 is a side perspective view of the air filter apparatus of FIG. 20 in a closed configuration.

Referring now to FIGS. 20-21, another implementation of an air filter apparatus is representatively illustrated. Air filter apparatus (apparatus) 236 includes an air filter 238 having a filtering medium 240 at least partially housed within a housing 242. A cover 246 is shown removed from the air filter and a bag 244 is shown at the top of the air filter. The bag could be attached to the air filter or cover with glue or staple(s) or another attachment mechanism or it could not be attached to either but simply held in place by the cover when the cover is in a closed configuration (as shown in FIG. 21). In the closed configuration the cover not only holds the bag in place but keeps it collapsed. The bag is seen to be folded in an accordion fold, though any other fold or collapsed configuration is possible (including rolling the bag to a collapsed configuration, scrunching it, and so forth). The cover can be removed to access the bag to dispose of the air filter. In implementations the cover in the closed configuration is biased to stay closed using a friction fit. In implementations the cover is formed of a cardboard-like element and/or the same material from which the housing is formed. When the user desires to use the bag the user simply manually removes the cover to expose the bag and then expands the bag to receive the air filter. The bag can then be tied or otherwise secured closed to carry the air filter to a waste receptacle.

In implementations cover 246 could instead be formed of a stretchable material such as a plastic wrap (similar or identical to cellophane wraps, formed of cellophane or another thin stretchable polymer) which may or may not be transparent and which may be wrapped around the top end (or any other end) of the air filter with the bag in place to secure the bag in place. Alternatively, a shrink-fit material (such as a shrink-fit polymer), which may or may not be transparent, could be used as the cover—the bag could be placed in the stored location and the shrink-fit material could be heated, such as with heated air, to shrink it to secure the bag in its place and to secure the shrink-fit material to the air filter using a friction fit. The stretchable material or shrink-fit material may be removed such as by unwrapping or tearing or by manually pulling to overcome a friction fit between the cover and air filter to access the bag. The stretchable material or shrink-fit material may cover the same or a similar portion of the air filter, and have the same or a similar shape, as cover 246 of FIG. 21.

Figure 22:
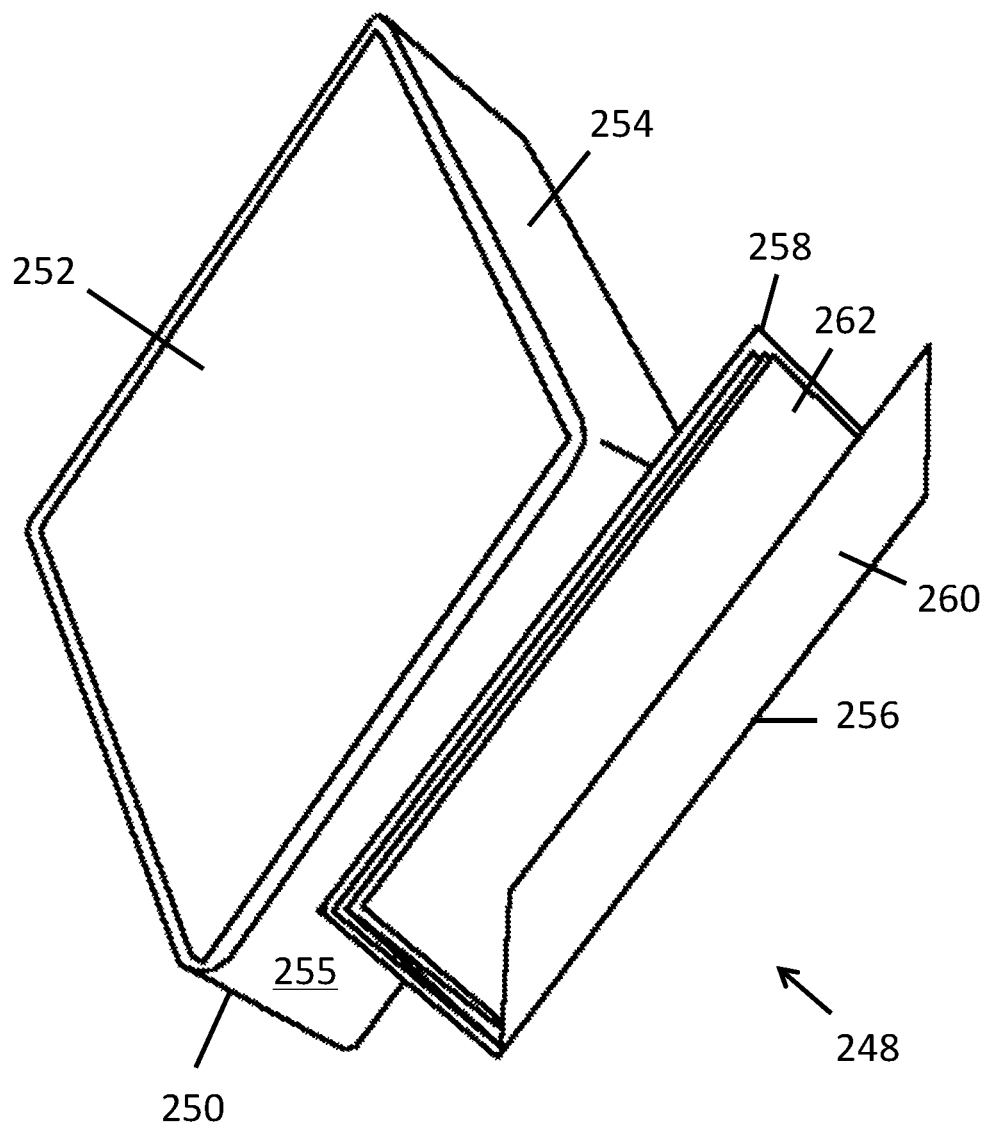
FIG. 22 is a top perspective view of another implementation of an air filter apparatus in a partially disassembled configuration.

Referring now to FIG. 22, another version of an air filter apparatus is representatively illustrated. Air filter apparatus (apparatus) 248 includes an air filter 250 which includes a filtering medium 252 at least partially housed within a housing 254. A bag holder (cover) 256 includes a first flap 258 and a second flap 260, and a bag 262 is situated between the two flaps. The bag may be adhered or attached to the first or second flap using a glue, staple(s), or another attachment mechanism, or it may sit loose between the flaps. The first and second flaps may be secured closed relative to one another using an adhesive, staple(s), or other coupling mechanism. The underside of the first flap (not seen) may be secured to a surface 255 of the housing, such as using a glue, staple(s), or another attachment mechanism. The bag is seen in an accordion fold, though any other type of fold or collapsed configuration could be used. When a user desires to use the bag to discard the air filter the user can simply open the bag holder by breaking the coupling that keeps the first and second flaps secured closed (such as by manually breaking an adhesive bond or stapled coupling or other attachment), and then the bag may be expanded to receive the air filter.

Figure 23:
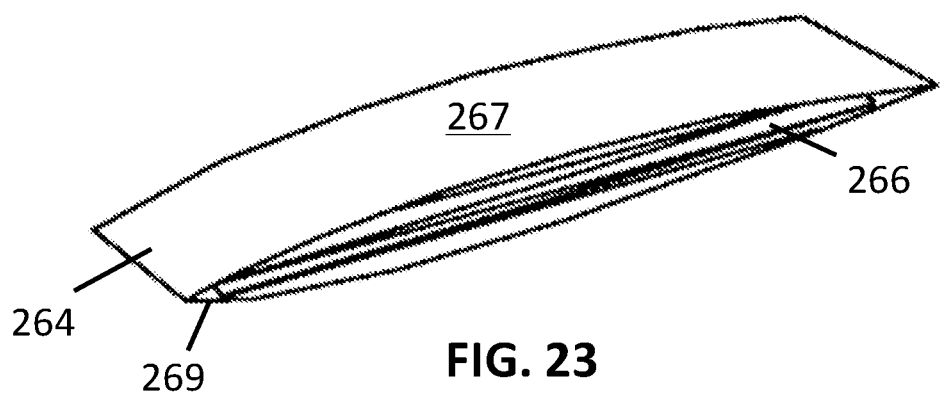
FIG. 23 is a front perspective view of an implementation of a bag holder of an air filter apparatus.
Figure 24:
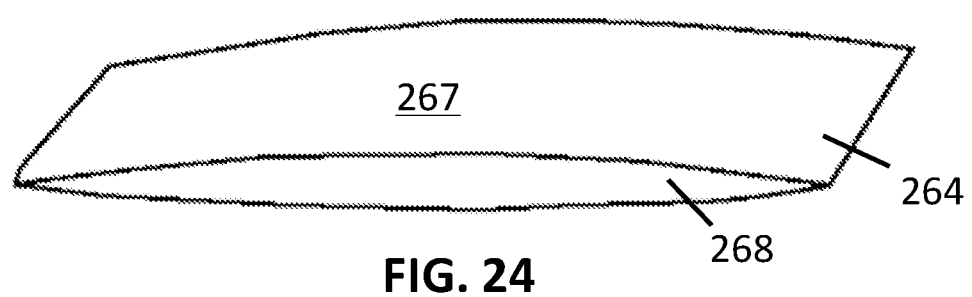
FIG. 24 is a rear perspective view of the bag holder of FIG. 23.

FIGS. 23-24 show another version of a bag holder (cover) 264 that could be attached to a top, bottom, side, front or back of an air filter (for example it could be attached to the top of an air filter similar to bag holder 256). Bag holder 264 has an envelope-like configuration, being formed of merely two or three flexible elements (such as formed of paper or a cardboard-like element or thin polymer or the like). In FIG. 24 the bag holder is seen to have a rear panel 268 coupling a top panel 267 and bottom panel 269 together and creating a closed back of the envelope shape. The front of the envelope shape is opened and a bag 266 in a collapsed configuration is shown inserted therein in FIG. 23. The bag sits between the top panel and bottom panel and is prevented from escaping the back of the envelope shape by the rear panel. The top and back panels are situated opposite one another and form a slot to receive the bag. In implementations the rear panel could be excluded and the top panel and bottom panel could be directly coupled/attached together at three sides including the rear side (instead of only two sides). In implementations the bag may stay secure in the envelope shape or slot by a friction fit but may not be attached to the bag holder (in other words it can be fully removed from the bag holder). The bottom panel may be adhered or otherwise attached to a surface of an air filter housing similar to bag holder 256. The bag holder retains the bag in a collapsed configuration until it is opened more (such as by manual force opening the bag holder to a more open configuration) or until the bag is removed therefrom. The top and bottom panels could be adhered, stapled or otherwise secured closed at the front (in addition to the back) so that they must be manually opened by breaking the adhesion or other attachment mechanism, or tearing the bag holder, to expose the bag.

Figure 25:
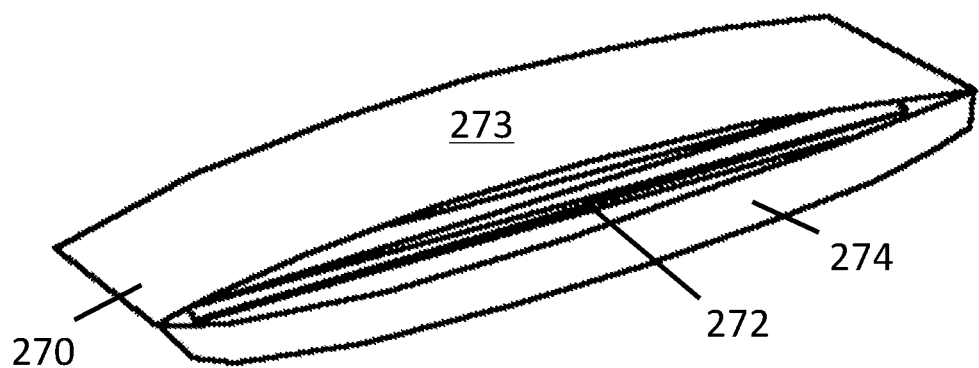
FIG. 25 is a front perspective view of another implementation of a bag holder of an air filter apparatus.

FIG. 25 shows a bag holder (cover) 270 that is similar to bag holder 264 except that it also includes a front closure 274 that, once the bag 272 is inserted, can be tucked back into the rest of the bag holder (between the bag and top panel 273) and remain there with a friction fit to keep the bag secure (when the user desires to use the bag the front closure can simply be manually untucked to open the bag holder to expose the bag and fully remove the bag from the bag holder). Alternatively, the front closure could have an adhesive element (such as a dry adhesive common on mailing envelopes that requires wetting to activate or an adhesive exposed by removal of a strip of material) and the front closure could be secured to the top or upper surface of the top panel of the bag holder to secure the bag holder in a closed configuration. Depending on which side of the front closure includes the adhesive or other coupling mechanism, the front closure may also be secured to the underside or bottom surface of the top panel. In either case, the user could manually tear the bag holder open (similar to tearing a mailing envelope) to expose the bag when the user desires to use the bag. Bag holders 264 and 270 could be formed of a thin paper, such as a mailing envelope, in implementations, or a thin cardboard like element, a thin polymer, or the like. In implementations a thin flexible polymer (like a plastic wrap, transparent or otherwise) could be used to form bag holders 264 and 270. Bag holder 270 includes a bottom panel opposite (under) the top panel 273 similar to bag holder 264. The bottom panel and top panel 273 together form an envelope-like slot for receiving the bag in a friction fit or in a loose fit. If the bag is loose in bag holder 270 the front closure will keep it securely within the bag holder until the user breaks/tears the bag holder open or otherwise opens the bag holder (such as by untucking the front closure to remove the bag. Other configurations are possible, the front closure could be secured closed using a magnet, or using one or more slits within the top panel that the front panel is inserted into in the closed configuration to be biased closed using a friction fit, or a string attached to the front closure could be secured to a button or winding element on the top panel or vice versa (similar to common inter-office mail envelopes) to secure the bag holder closed, and so forth. In implementations the disposal bag could be secured to the bag holder 270 (or bag holder 264) using an adhesive or staple(s) or other attachment mechanism.

In implementations a bag holder or cover could simply be a baggie, such as a clear, thin plastic bag with a closure (e.g., a manual zip-closure) that is adhered to or stapled or otherwise secured to (or coupled with) the air filter and which includes the disposal bag. In such cases the disposal bag need not be adhered to the baggie but could sit loosely therein and secured in place and in the collapsed configuration when the baggie is closed.

Figure 26:
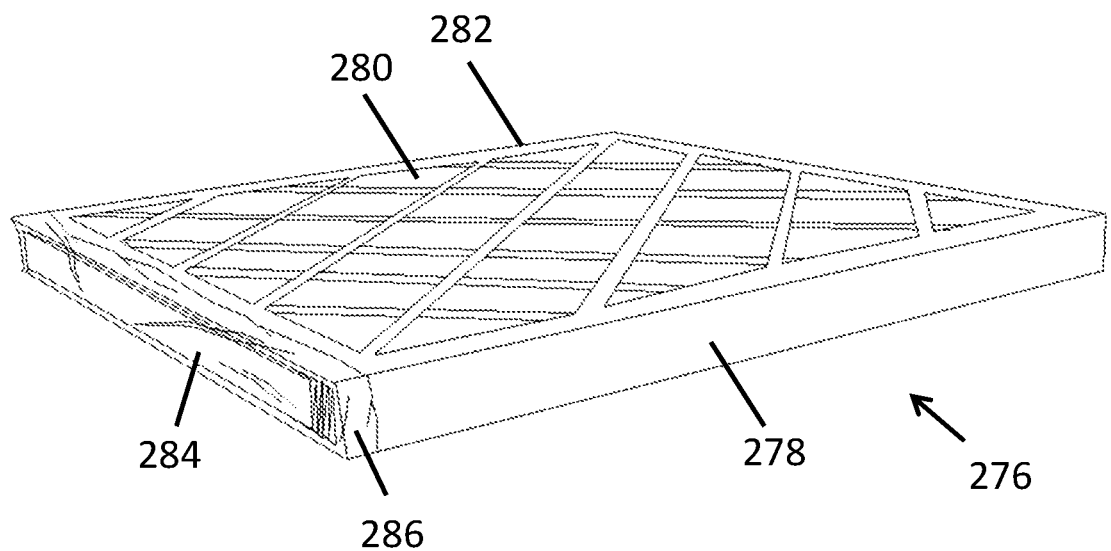
FIG. 26 is a side perspective view of another implementation of an air filter apparatus.

Referring now to FIG. 26, another implementation of an air filter apparatus is representatively illustrated. Air filter apparatus (apparatus) 276 includes an air filter 278 having a filtering medium 280 at least partially housed within a housing 282. A cover 286 is shown coupled to the air filter (attached thereto) and a bag 284 is shown at the top of the air filter between the cover and the air filter. The bag could be attached to the air filter or it could not be attached thereto, but the cover, when in a closed configuration (as shown in FIG. 26) keeps the bag securely in place. The bag is seen to be folded in an accordion fold, though any other fold or collapsed configuration is possible (including rolling the bag to a collapsed configuration, or scrunching it, or so forth). The cover in this implementation is a thin plastic wrap, such as a thin and transparent cellophane wrap (though the cover could be non-transparent, and the cover may be formed of cellophane or any other thin stretchable polymer, such as a thin polyvinyl chloride or polyethylene or another stretchable polymer). The cover may be wrapped around the top portion of the air filter as shown in FIG. 26 to secure it thereto using a friction fit, or in implementations one or more adhesives could be used to couple the cover with the air filter. The cover can be removed by unwrapping it (in instances where it is wrapped) or it can otherwise be torn, or peeled or pulled off of the air filter with manual force, to expose the bag. Once the bag is exposed the bag can be expanded to receive the air filter. In instances wherein the bag is not attached to the air filter (i.e., wherein it is not glued or otherwise secured thereto but is only held in place by the cover) the bag may be fully removed from between the cover and air filter and used to receive and dispose of the air filter.

In implementations the air filter apparatuses herein are more convenient and safer to use than existing air filters, because they allow for the placement of air filters in a disposal bag immediately upon removal of the air filter from an HVAC unit or the like. This prevents occupants of a building (and the technician removing the air filter, when applicable) from inhaling dust and particulates, which can be dangerous. In that sense the air filter apparatuses can be similar to personal protective equipment (PPE) used to protect technicians and users from inhaling dust and particulates, which dust and particulates can be dangerous for the lungs and health of technicians/users. The air filter apparatuses disclosed herein also may generally prevent or reduce the distribution of debris, pollen, viruses, allergens, dust, and other particulates into the air, to the benefit of all.

In the air filter industry there has been a long-felt but unmet need to address the concerns of safe air filter removal and disposal. A Feb. 20, 2020 article titled "Five Tips for Properly Disposing of an Old Air Filter" (disclosed as non-patent literature), for example, discusses the problem of dirt and debris being released back into the air when removing/replacing an old filter and moving it to a trash can. The article encourages the user to have a plastic bag ready to immediately put the old filter in upon removal of the air filter from the furnace or intake vent, to not shake or bump the air filter outside or inside the bag, to avoid sudden movements, to close the bag as much as possible (such as with drawstrings), to further tape the bag to more fully close it with an extra-sticky and strong tape (such as duct tape) and using extra strips of tape if needed, and to not dispose of the air filter indoors but instead to dispose of it in an outside trash can. The many steps provided by this article highlight the dangerous nature of the dust, debris, and even non-visible microscopic particles (including mold spores, bacteria, viruses, and the like) that can be released into the air while removing the old filter and disposing of it—thus the article encourages many procedural steps to ensure safety and to prevent distribution of dust, particulates, etc. into the air during air filter replacement.

The air filter apparatuses and bag holders disclosed herein are game changers for the air filter industry because they satisfy a long-felt but unmet need of always having a disposal bag nearby and ready when removing an old air filter. This maintains clean air and facilitates a healthier living environment by minimizing redistribution of mold spores, allergens, pollutants, bacteria, viruses, dust, and debris back into the environment/air. This is accomplished without changing the size, shape, material, or function of the air filter itself. The apparatuses and bag holders disclosed herein accordingly facilitate cleaner and healthier air and a cleaner and healthier environment.

A Jul. 7, 2020 WIKIHOW article titled "How to Change a Home Air Filter" (disclosed as non-patent literature) discusses using a garbage bag to carry an old air filter to the garbage and also discusses using a vacuum cleaner to clean up residual dust/debris. The air filter apparatuses and bag holders disclosed herein remove the need for the user to bring a bag to the air filter and also minimize the need for later vacuuming because the disposal bag is coupled with the air filter already and can be used to enclose the air filter during or immediately after removal from an HVAC unit or the like, thus minimizing any dust, particulates or the like that need to be vacuumed.

The air filter apparatuses and bag holders disclosed herein may make homes, restaurants, businesses, and other buildings/locations safer, preventing or reducing the spread of viruses, bacteria, dust, debris, etc. It has been found that in restaurants and other establishments viruses and other harmful particles can travel all around the room/location in the circulating air of an HVAC system or the like, so that viral and other harmful particles can reach people very far away from the person from whom they emanate, spreading sickness and the like. Accordingly, having clean air filters, and being able to reduce the distribution of particulates, viruses, bacteria, mold spores, and the like, during filter replacement, is useful to help prevent or minimize the spread of sicknesses, viruses, etc. The air filter apparatuses and bag holders disclosed herein help facilitate such efforts to prevent the spread of sicknesses, viruses, airborne health hazards, and so forth.

The representative examples disclosed herein are only examples, and there are many other configurations of air filter apparatuses, bag holders, and related elements that are possible.

Any of the adhesives herein could be a gummy adhesive and/or could be a selectively reusable adhesive (such that the corresponding flaps or the like could be opened/closed multiple times)—but in other implementations the adhesives are single-use adhesives so that the flaps may be opened once to expose and use the bag but cannot be resealed again using the same adhesive.

Any of the flaps, pull strips, and/or bag covers that are used to cover and expose the bags may be called "closures," "covers," "removable closures," "removable covers," "openable closures," "openable covers," or the like. In implementations the closure or cover that keeps the bag secure to the air filter could simply be a thin transparent polymer that is meant to be torn (such as using a tear strip or pull strip or the like) to expose the bag to use it. Any of the bags disclosed herein may be called "disposal bags" inasmuch as they are used to dispose of the air filters. Each bag in a stored configurations (before being expanded and/or unfolded and/or opened) may be said to be in a collapsed configuration or a fully collapsed configuration. As used herein, the term "fully collapsed" means that the bag has at least one of the following configurations: it contains less than 2 cubic cm of interior volume; or it has an interior volume 5% or less than a maximum interior volume achievable through expansion of the bag without plastic deformation of the bag. As used herein, the term "maximum interior volume" refers to a theoretical maximum volume of liquid the bag could hold if the bag were able to conform to and hold any shape and position without support and regardless of any forces imposed by the liquid on the bag.

Any of the bags disclosed herein could be formed of polymer, paper or a thin cardboard/cardstock material.

In places where the phrase "one of A and B" is used herein, including in the claims, wherein A and B are elements, the phrase shall have the meaning "A and/or B." This shall be extrapolated to as many elements as are recited in this manner, for example the phrase "one of A, B, and C" shall mean "A, B, and/or C," and so forth. To further clarify, the phrase "one of A, B, and C" would include implementations having: A only; B only; C only; A and B but not C; A and C but not B; B and C but not A; and A and B and C.

In places where the description above refers to specific implementations of air filter apparatuses and related methods, one or more or many modifications may be made without departing from the spirit and scope thereof. Details of any specific implementation/embodiment described herein may, wherever possible, be applied to any other specific implementation/embodiment described herein. The appended claims are to encompass within their scope all such changes and modifications as are within the true spirit and scope of this disclosure.

Furthermore, in the claims, if a specific number of an element is intended, such will be explicitly recited, and in the absence of such explicit recitation no such limitation exists. For example, the claims may include phrases such as "at least one" and "one or more" to introduce claim elements. The use of such phrases should not be construed to imply that the introduction of any other claim element by the indefinite article "a" or "an" limits that claim to only one such element, and the same holds true for the use in the claims of definite articles.

Additionally, in places where a claim below uses the term "first" as applied to an element, this does not imply that the claim requires a second (or more) of that element—if the claim does not explicitly recite a "second" of that element, the claim does not require a "second" of that element. Furthermore, in some cases a claim may recite a "second" or "third" or "fourth" (or so on) of an element, and this does not necessarily imply that the claim requires a first (or so on) of that element—if the claim does not explicitly recite a "first" (or so on) of that element (or an element with the same name, such as "a widget" and "a second widget") then the claim does not require a "first" (or so on) of that element.

Method steps disclosed anywhere herein, including in the claims, may be performed in any feasible/possible order. Method steps recited in the claims do not require the steps to be performed in the order in which the steps are presented—such steps may be performed in any order except any orders which are technically impossible. However, in some implementations the methods may be performed in the order in which the steps are presented herein, including in the claims.

What is claimed is:

1. An air filter apparatus, comprising:
an air filter comprising a filtering medium at least partially housed within a housing;
a cover coupled with the air filter; and
a disposal bag in a fully collapsed configuration situated at least partially between the cover and the air filter;
wherein the cover comprises a flap that is secured closed using one of an adhesive and one or more staples, the flap configured to be manually opened to expose the disposal bag and to allow expansion of the disposal bag to an expanded configuration;
wherein the disposal bag in the expanded configuration is sized to fully receive the air filter and to be secured closed with the air filter therein.

2. The apparatus of claim 1, wherein the air filter comprises one of a residential HVAC air filter and a commercial HVAC air filter.

3. The apparatus of claim 1, wherein the disposal bag in the fully collapsed configuration is folded.

4. The apparatus of claim 3, wherein the disposal bag in the fully collapsed configuration is folded in an accordion fold.

5. The apparatus of claim 1, wherein the flap comprises a fold.

6. The apparatus of claim 5, wherein the flap comprises two folds.

7. The apparatus of claim 6, wherein the flap comprises three folds.

8. An air filter apparatus, comprising:
an air filter comprising a filtering medium at least partially housed within a housing;
a cover coupled with the air filter; and
a disposal bag in a fully collapsed configuration situated at least partially between the cover and the air filter;
wherein the cover is configured to be manually opened to expose the disposal bag and to allow expansion of the disposal bag to an expanded configuration;
wherein the disposal bag in the expanded configuration is sized to fully receive the air filter and to be secured closed with the air filter therein;
wherein the cover comprises a bag holder not integrally formed with the housing but attached to the housing, the bag holder at least partially surrounding the disposal bag when in a closed configuration; and
wherein the bag holder comprises one or more flaps that are secured closed using one of an adhesive and one or more staples, the one or more flaps being manually openable, the one or more flaps configured to retain the disposal bag in the fully collapsed configuration when secured closed.

9. An air filter apparatus, comprising:
an air filter comprising a filtering medium at least partially housed within a housing;
a cover coupled with the air filter; and
a disposal bag in a fully collapsed configuration situated at least partially between the cover and the air filter;
wherein the cover is configured to be manually opened to expose the disposal bag and to allow expansion of the disposal bag to an expanded configuration;
wherein the disposal bag in the expanded configuration is sized to fully receive the air filter and to be secured closed with the air filter therein; and
wherein the cover comprises a pull strip configured to expose the disposal bag.

10. The apparatus of claim 9, wherein the pull strip is coupled, using an adhesive, to one of the air filter and the disposal bag.

11. The apparatus of claim 9, wherein the pull strip is configured to expose the disposal bag by forming one of an opening and a tear.

12. The apparatus of claim 1, wherein the disposal bag comprises a closure member proximate an opening of the disposal bag and configured to close the opening of the disposal bag.

13. The apparatus of claim 12, wherein the closure member comprises one or more tape strips having removable portions configured to expose an adhesive.

14. The apparatus of claim 1, wherein the disposal bag is attached to the air filter.

15. The apparatus of claim 14, wherein the disposal bag is attached to the air filter using an adhesive.

16. The apparatus of claim 1, further comprising one or more magnets coupled with the air filter.

17. The apparatus of claim 1, wherein the cover comprises a pull strip configured to expose the disposal bag.

18. The apparatus of claim 9, wherein the disposal bag in the fully collapsed configuration is folded.

19. The apparatus of claim 9, wherein the disposal bag comprises a closure member proximate an opening of the disposal bag and configured to close the opening of the disposal bag.

20. The apparatus of claim 9, wherein the disposal bag is attached to the air filter.

* * * * *

UNITED STATES PATENT AND TRADEMARK OFFICE
CERTIFICATE OF CORRECTION

PATENT NO. : 11,376,538 B2
APPLICATION NO. : 17/444660
DATED : July 5, 2022
INVENTOR(S) : Wilkins et al.

It is certified that error appears in the above-identified patent and that said Letters Patent is hereby corrected as shown below:

In the Specification

Column 9, Line 6, replace "a facial" with -facial-.
Column 15, Line 62, replace "bag" with -bag)-.

Signed and Sealed this
Thirtieth Day of August, 2022

Katherine Kelly Vidal
*Director of the United States Patent and Trademark Office*